(12) United States Patent
Kim et al.

(10) Patent No.: US 9,031,340 B2
(45) Date of Patent: May 12, 2015

(54) PROVIDING A FEATURE HIDDEN IMAGE AND DETECTING AND RECOVERING A TAMPERED DIGITAL IMAGE

(71) Applicant: KT Corporation, Gyeonggi-do (KR)

(72) Inventors: Kyung-Su Kim, Seoul (KR); Bong-Ki Kim, Chungcheongbuk-do (KR); Jong-Hwan Kim, Daejeon (KR); Hyun-Ho Jeong, Daejeon (KR)

(73) Assignee: KT Corporation, Gyeonggi-do (KR)

( * ) Notice: Subject to any disclaimer, the term of this patent is extended or adjusted under 35 U.S.C. 154(b) by 163 days.

(21) Appl. No.: 13/645,543

(22) Filed: Oct. 5, 2012

(65) Prior Publication Data
US 2013/0089257 A1  Apr. 11, 2013

(30) Foreign Application Priority Data
Oct. 5, 2011  (KR) .................. 10-2011-0101449

(51) Int. Cl.
*G06K 9/46* (2006.01)
*G06T 1/00* (2006.01)

(52) U.S. Cl.
CPC ....... *G06T 1/0028* (2013.01); *G06T 2201/0051* (2013.01); *G06T 2201/0061* (2013.01); *G06T 2201/0203* (2013.01)

(58) Field of Classification Search
CPC .......... H04N 7/26563; H04N 7/26579; H04N 7/26393; H04N 7/2651; G06T 9/007; G06T 7/0083; G06T 2207/10016; G06K 9/48; G11B 27/28

USPC ......... 382/100, 170, 175, 232, 240, 243, 149, 382/173, 190, 118, 298, 300; 358/3.28; 714/819; 375/E7.134, E7.161
See application file for complete search history.

(56) References Cited

U.S. PATENT DOCUMENTS

| | | | | |
|---|---|---|---|---|
| 6,831,990 B2* | 12/2004 | Marvel et al. | .................. | 382/100 |
| 7,778,461 B2* | 8/2010 | Shi et al. | ........................ | 382/170 |
| 8,184,850 B2* | 5/2012 | Shi et al. | ........................ | 382/100 |
| 8,285,998 B2* | 10/2012 | Echizen et al. | ............... | 713/176 |

FOREIGN PATENT DOCUMENTS

KR   10-2011-0046824 A    5/2011

* cited by examiner

*Primary Examiner* — Anh Do
(74) *Attorney, Agent, or Firm* — IP Legal Services, LLC

(57) ABSTRACT

Described embodiments provide an apparatus for providing a digital image by embedding recovery feature. The apparatus may include an input unit, an extraction unit, an embedding unit, and an output unit. The input unit may be configured to receive a digital image. The extraction unit may be configured to extract recovery feature from the received digital image using quad-tree decomposition. The recovery feature may be binary data that represents unique characteristics of the received digital image. The embedding unit may be configured to embed the extracted recovery feature into the received digital image. The output unit may be configured to output the digital image embedded with the recovery feature as a feature hidden image.

10 Claims, 18 Drawing Sheets

(a) 4×4 block partitioning (b) Quad-tree decomposition(r=0.048)

(a)

(b)

(c)

(a)  (b)  (c)

(a)  (b)  (c)  (d)

PROVIDING A FEATURE HIDDEN IMAGE AND DETECTING AND RECOVERING A TAMPERED DIGITAL IMAGE

CROSS REFERENCE TO PRIOR APPLICATIONS

The present application claims priority under 35 U.S.C. §119 to Korean Patent Application No. 10-2011-0101449 (filed on Oct. 5, 2011), which is hereby incorporated by reference in its entirety.

FIELD OF THE INVENTION

The present invention relates to authentication and verification of a digital image and, in particular, to detecting a tampered digital image and providing an original digital image from the tampered digital image.

BACKGROUND OF THE INVENTION

Due to advantages of a digital image, the digital image has been popularly used in various quality-sensitive image applications such as medical imaging and satellite imaging. Such a digital image, however, can be easily and illegally duplicated and distributed. For example, a malicious adversary can tamper with a quality-sensitive image through a public network. Accordingly, it is necessary to protect digital images from malicious users.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a digital image may be provided by embedding recovery feature in the digital image.

In accordance with still another aspect of the present invention, a tampered digital image may be detected based on recovery feature embedded therein and an original digital image may be restored by recovering the tampered digital image.

In accordance with an embodiment of the present invention, an apparatus may be provided for providing a digital image by embedding recovery feature. The apparatus may include an input unit, an extraction unit, an embedding unit, and an output unit. The input unit may be configured to receive a digital image. The extraction unit may be configured to extract a recovery feature from the received digital image using quad-tree decomposition. The recovery feature may be binary data that represents unique characteristics of the received digital image. The embedding unit may be configured to embed the extracted recovery feature into the received digital image. The output unit may be configured to output the digital image embedded with the recovery feature as a feature hidden image.

The extraction unit may be configured to extract the recovery feature from the original digital image with quad-tree decomposition. Such as extraction unit may be configured to decompose the received digital image into a plurality of variable-sized image blocks, to calculate an average pixel value of each one of the plurality of variable-sized image blocks, and to calculate a binary value of the calculated average pixel value of each block and combine binary values of the plurality of variable-sized blocks into a recovery feature of the received digital image.

The embedding unit may include a sub-sampling unit, a difference image generator, an embedding level generator, and a difference image modificator. The sub-sampling unit may be configured to receive the digital image and to generate a plurality of sub-sampled images by decomposing the received digital image according to a predetermined sampling position. The difference image generator may be configured to receive the sub-sampled images and to generate a plurality of difference images based on differences between one reference sub-sampled image and the others included in the sub-sampled images. The reference sub-sampled image is one selected from the sub-sampled images. The embedding level generator may be configured to calculate at least one embedding level from histograms of the plurality of difference images according to a length of the recovery feature. The difference image modificator may be configured to obtain empty bins by modifying the plurality of difference images using the at least one embedding level and to embed the recovery feature into the empty bins.

The embedding level generator may be configured to generate a left embedding level and a right embedding level according to a length of the recovery feature. Information on the left embedding level and the right embedding level may be provided with the feature hidden image.

The difference image modificator may be configured to generate first modified difference images having empty bins by modifying the difference images using the left embedding level and the right embedding level, to generate second modified difference images by embedding the recovery feature in the empty bins of the first modified difference images using the left embedding level and the right embedding level, and to transfer the second modified difference images to the output unit.

In accordance with another embodiment of the present invention, a method may be provided for providing a digital image by embedding recovery feature. The method may include extracting recovery feature from a digital image, generating a plurality of sub-sampled images by performing sub-sampling on the digital image, generating difference images based on differences between one sub-sampled image and the others, calculating embedding levels from histogram of the generated difference images according to a length of the recovery feature, obtaining empty bins for embedding the recovery feature in the digital image, embedding the recovery feature into the obtained empty bins, and providing the digital image embedded with the recovery feature as a feature hidden image.

The extracting may include decomposing the digital image into a plurality of variable-sized blocks using quad-tree decomposition, calculating an average pixel value of each block of the plurality of variable-sized blocks, and calculating a binary value of the calculated average pixel value and combining the calculated binary values of the plurality of variable-sized blocks, as the recovery feature of the digital image.

The decomposing may include dividing the digital image into four equal-sized blocks, determining whether values of all pixels in each equal-sized block are within a predetermined dynamic range and, if not, dividing the corresponding block into four sub-blocks.

The obtaining empty bins may include shifting a histogram of the difference images in left and right directions using the left and right embedding levels.

In accordance with still another embodiment of the present invention, an apparatus may be provided for detecting and recovering a tampered digital image. The apparatus may include an input unit, a restoration unit, and a verification unit. The input unit may be configured to receive a digital image. The restoration unit may be configured to extract a first recovery feature from the received digital image and to restore an original digital image by removing the first recovery feature from the received digital image, wherein the first recovery feature denotes unique characteristics of the received digital image. The verification unit may be configured to extract a second recovery feature from the restored original digital image wherein the second recovery feature denotes unique characteristics of the restored original digital image, to verify whether the received digital image is tampered or not by comparing the first recovery feature with the second recovery feature, to detect a tampered region of the original digital image when the first recovery feature is not identical to the second recovery feature, and to recover the detected tapered region of the received digital image using the first recovery feature.

The apparatus may further include an output unit configured to output the restored original digital image when the verification unit verifies that the received digital image is not tampered and to output the recovered digital image when the verification unit verifies that the received digital image is tampered.

The restoration unit may include a processor, a generator, a memory, a first extractor, and a restorer. The processor may be configured to generate a plurality of sub-sampled images by decomposing the received digital image according to a predetermined sampling position. The generator may be configured to generate a plurality of difference images based on difference between one reference sub-sampled image and the others included in the plurality of sub-sampled images. The memory may be configured to store embedding levels that are used to embed the first recovery feature in the received digital image. The first extractor may be configured to extract the first recovery feature from the difference image using the embedding levels stored in the memory. The restorer may be configured to generate a first modified difference image by removing the first recovery feature from the difference image and to generate second modified difference images by removing empty bins from the first modified difference images using the embedding levels.

The verification unit may include a second extractor and a verificator. The second extractor may be configured to extract the second recovery feature from the restored original image using quad-tree decomposition. The verificator may be configured to compare the first recovery feature received from the restoration unit and the second recovery feature received from the verification unit of the extraction unit. The restoration unit may be configured to detect locations of different bits in the second modified difference image as a tampered region of the second modified difference image, to obtain an average pixel value of each block corresponding to the locations of different bits from the first recovery feature, and to recover the tampered region of the second modified difference image based on the obtained average pixel value.

The first extractor of the restoration unit may be configured to decompose the received digital image to a plurality of variable-sized blocks using quad-tree decomposition and to extract an average pixel value of each one of the plurality of variable sized blocks as the first recovery feature. The second extractor of the verification unit may be configured to decompose the restored original digital image into a plurality of variable-sized blocks using the quad-tree decomposition and to extract an average pixel value of each one of the plurality of variable-sized blocks.

In accordance with yet another embodiment of the present invention, a method may be provided for detecting a tampered digital image and restoring an original digital image by recovering the detected tampered digital image. The method may include restoring an original digital image by removing a first recovery feature from a received digital image, determining whether the received digital image is tampered with, recovering a tampered region of the digital image when the digital image is tampered as the determination result and outputting the recovered digital image, otherwise, outputting the restored original image.

The restoring an original digital image may include dividing the received digital image into a plurality of sub-sampled images by performing sub-sampling on the digital image, generating difference images based on difference between one reference sub-sampled image with the others in the sub-sampled images, extracting the first recovery feature from the difference images, wherein the first recovery feature is binary data representing unique characteristics of the received digital image, removing the extracted first recovery feature from the difference images, and removing empty bins in the digital image.

The determining may include extracting second recovery feature from the restored original image, comparing the extracted second recovery feature with the first recovery feature, determining that the received digital image is not tampered with when the extracted second recovery feature is identical to the first recovery feature, and determining that the received digital image is tampered with when the extracted second recovery feature is different from the first recovery feature.

The recovering a tampered region of the digital image may include detecting the tampered region of the received digital image based on different bits in the restored original image and recovering the detected tampered region based on an average value of a corresponding block in the first recovery feature.

The first recovery feature may be extracted using left and right embedding levels provided by an apparatus embedding the first recovery feature in the received digital image.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
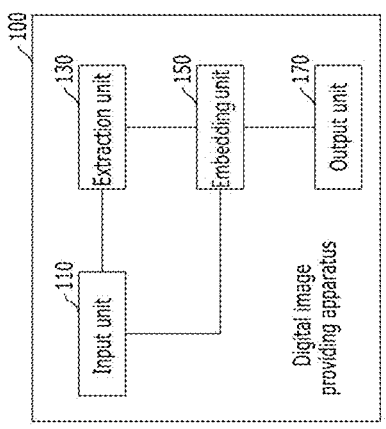
FIG. 1 shows an apparatus for providing a digital image by embedding recovery feature in the digital image in accordance with embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with embodiments of the present invention, recovery feature of a digital image may be extracted from an image and the extracted recovery feature may be embedded in the digital image before distributing the digital image for image authentication and integrity verification. Such a digital image embedded with the recovery may be referred to as a feature hidden digital image. When a digital image is provided, the digital image may be validated whether the digital image is tampered with based on recovery feature embedded therein. When the digital image tampered with, a tampered region is recovered and an original digital image may be restored using the recovery feature embedded in the digital image. Hereinafter, an apparatus for providing a digital image by embedding recovery feature in the digital image in accordance with embodiments of the present invention will be described with reference to FIG. 1 to FIG. 5.

Figure 2:
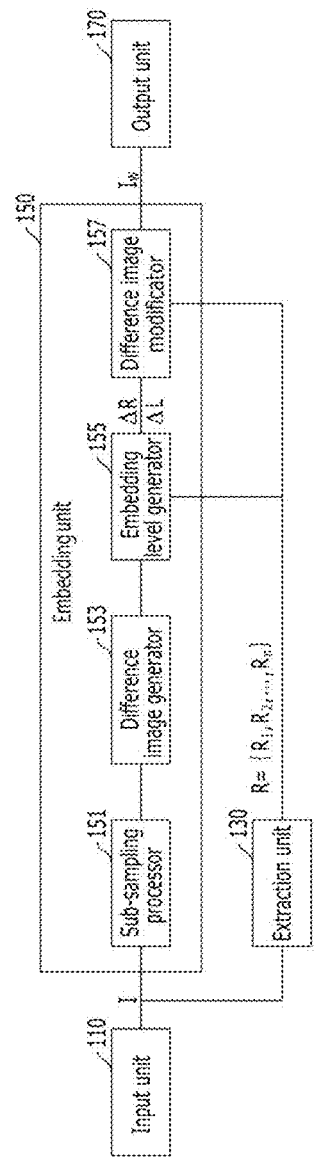
FIG. 2 shows an embedding unit of FIG. 1 in accordance with embodiments of the present invention.
Figure 3:
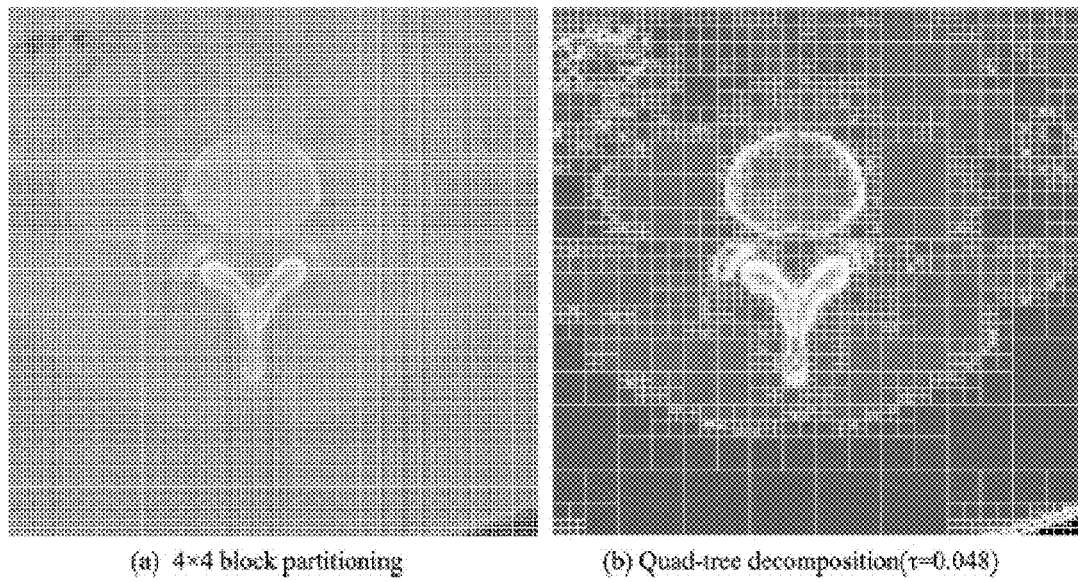
FIG. 3 shows 12-bit 512×512 digital image divided into equal-sized blocks using a typical partitioning scheme and the same digital image divided into variable-sized blocks using a quad-tree decomposition scheme in accordance with embodiments of the present invention.
Figure 4:
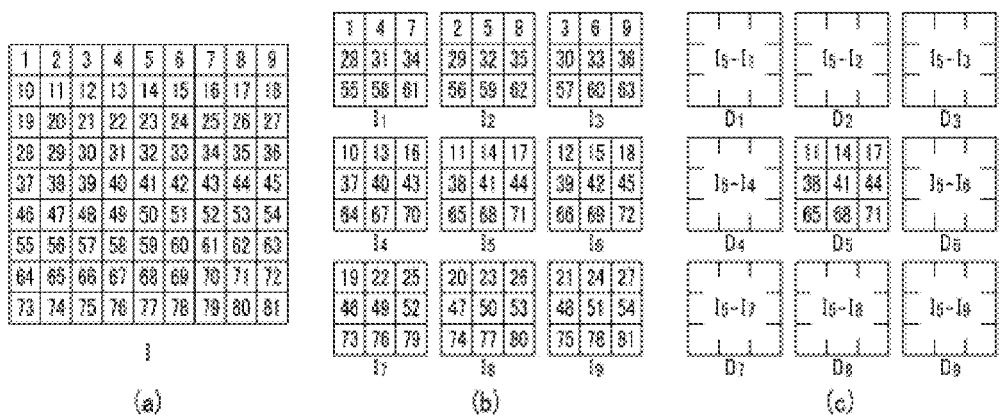
FIG. 4 shows sub-sampling an original digital image and generating difference images based on the sub-sampled images.
Figure 5:
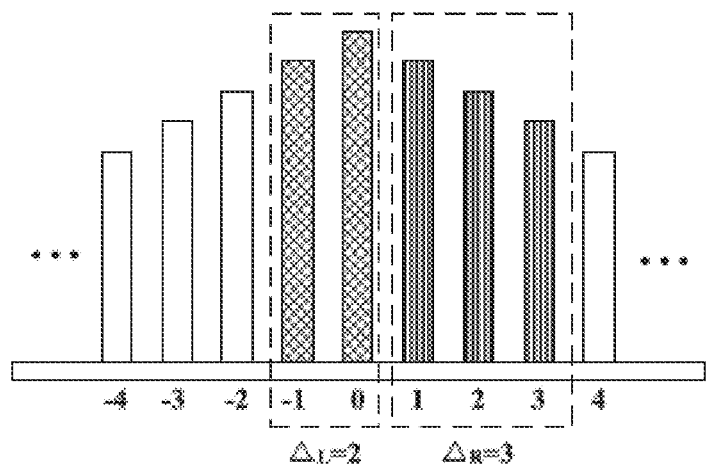
FIG. 5 shows selecting empty bins in histogram of difference images in accordance with embodiments of the present invention.

FIG. 1 shows an apparatus for providing a digital image by embedding recovery feature in the digital image in accordance with embodiments of the present invention. FIG. 2 shows an embedding unit of FIG. 1 in accordance with embodiments of the present invention. FIG. 3 shows 12-bit 512×512 digital image divided into equal-sized blocks using a typical partitioning scheme and the same digital image divided into variable-sized blocks using a quad-tree decomposition scheme in accordance with embodiments of the present invention. FIG. 4 shows sub-sampling an original digital image and generating difference images based on the sub-sampled images. FIG. 5 shows selecting empty bins in histogram of difference images in accordance with embodiments of the present invention.

Referring to FIG. 1, apparatus 100 may obtain recovery feature of a digital image, embed the obtained recovery feature in the digital image, and provided such feature hidden digital image in accordance with embodiments of the present invention. Such apparatus 100 may be referred to as a digital image providing apparatus. The recovery feature may be embedded in the digital image before distribution for image authentication and integrity verification in accordance with embodiments of the present invention. Apparatus 100 may include input unit 110, extraction unit 130, embedding unit 150, and output unit 170.

Input unit 110 may receive an original digital image. For example, input unit 110 may receive a digital image captured by a camera. The present invention, however, is not limited thereto. Input unit 110 may receive an analog image and convert the received analog image to a digital image.

Extraction unit 130 may extract recovery features from the received original image using various structural analysis techniques, such as quad-tree decomposition. The recovery features may be binary data that represents unique characteristics of the original digital image.

Particularly, extraction unit 130 may decompose the received original digital image into a plurality of variable-sized blocks using quad-tree decomposition in accordance with embodiments of the present invention. The quad-tree decomposition may be referred to as quad-tree adaptive partitioning. For example, extraction unit 130 may i) divide the received original digital image into four equal-sized blocks and ii) test each block to confirm whether all pixels in each block are within a specific dynamic range in order to meet a homogeneity criterion. If a block meets this homogeneity criterion, iii) extraction unit 130 does not further divide the block. Otherwise, iv) extraction unit 130 sub-divides the block into four sub-blocks. As a result, extraction unit 130 may divide the received original digital image into a plurality of variable-sized blocks unlike a typical 4×4 block partitioning. A diagram (a) of FIG. 3 shows an image divided into a plurality of equal-sized blocks, each equal-sized block having a size of 4 pixels (horizontal) by 4 pixels (vertical). A diagram (b) of FIG. 3 shows an image divided into a plurality of variable-sized blocks using the quad-tree decomposition in accordance with embodiments of the present invention. As shown in the diagram (b) of FIG. 3, each block has a different size. For example, the plurality of blocks may have various sizes, such as $2^n \times 2^n$. Furthermore, a low-frequency region of an image may be divided into blocks with a comparatively large size and a middle-frequency region and/or a high-frequency region of the image may be divided into a block with a comparatively small size in the quad-tree decomposition in accordance with embodiments of the present invention.

After decomposition, extraction unit 130 may calculate an average pixel value of each one of the variable-sized blocks and calculate a binary value of the average pixel value as the recovery feature of each block. Extraction unit 130 may combine the calculated binary values of the variable-sized blocks as the recovery feature of the received original digital image. Accordingly, the recovery feature of the received original image may consist of 0 or 1 and its length is the same as the bit depth describing the number of bits in one pixel.

Such feature extraction using the quad-tree adaptive partitioning in accordance with embodiments of the present invention may provide better performance as compared to a typical partitioning method in terms of the length of the recovery feature to be embedded and the objective quality of the feature hidden image. In addition, the quad-tree decomposition may be more useful when the regions having middle-frequency components and/or high-frequency components are tampered with. In addition, the quad-tree decomposition of the received original image and that of a feature hidden image are in some cases possibly different. The feature hidden image may be the original digital image embedded with the recovery feature. Since each block after the quad-tree decomposition can be represented 2'×2" pixels, the block size may be converted into binary form. Such quad-tree information may be attached to or otherwise associated with the recovery feature.

Embedding unit 150 may receive the extracted recovery feature from extraction unit 130 and embed the recovery feature into the received original image using a lossless data hiding technique in accordance with embodiments of the present invention. The lossless data hiding technique may be referred to as a reversible data hiding algorithm.

For example, embedding unit 150 may use a histogram shifting scheme to hide data in the original image. Particularly, embedding unit 150 may obtain empty bins by modifying histograms around a peak point where data is inserted and insert data in the obtained empty bin by distributing the peak point in the obtained empty bin. Furthermore, embedding unit 150 may use a histogram shifting scheme using differences between adjacent pixels in order to insert a message for recovering the original image. Embedding unit 105 may obtain the difference histogram based on a difference between the adjacent pixels.

FIG. 2 shows an embedding unit of FIG. 1 in accordance with embodiments of the present invention.

Referring to FIG. 2, embedding unit 150 may include sub-sampling processor 151, difference image generator 153, embedding level generator 155, and difference image modificator 157.

As shown in FIG. 2, input unit 110 is connected to sub-sampling processor 151 and extraction unit 130. Input unit 110 may receive the original image and transfer the received image to sub-sampling processor 151 and extraction unit 130.

Extraction unit 130 is coupled to embedding level generator 155 and difference image modificator 157. Extraction unit 130 may transfer the recovery feature extracted from the original digital image to embedding level generator 155 and difference image modificator 157.

Difference image modificator 157 is coupled to output unit 170 and transfer a feature hidden image to output unit 170. The feature hidden image may be referred to an image with recovery feature embedded. Output unit 170 may output the feature hidden image.

Sub-sampling processor 151 may receive the received original digital image I from input unit 110. For example, a diagram (a) of FIG. 4 shows the received original digital image of size 9 pixels×9 pixels. Sub-sampling processor 151 may perform sub-sampling on the received original digital image I to decompose the received image I into a plurality of sub-sampled images. In case of the received digital image of size 9 pixels×9 pixels, the digital image is divided into nine sub-sampled images $I_1$ to $I_9$ as shown in a diagram (b) of FIG. 4. As described, the sub-sampling may be a process of generating a plurality of sub-sampled images by decomposing the original image I based on a sampling position.

Difference image generator 153 may receive the sub-sampled images from sub-sampling processor 151 and generate difference images $D_k$ using the sub-sampled images. For example, difference image generator 153 may receive nine sub-sampled images $I_1$ to $I_9$ and generate eight difference images $D_1$ to $D_4$ and $D_6$ to $D_9$ as shown in a diagram (c) of FIG. 4. Particularly, difference image generator 153 may use fifth sub-sampled image $I_5$ as a reference image. For example, difference image generator 153 may generate first difference image $D_1$ by obtaining difference between first sub-sampled image $I_1$ and the reference sub-sampled image $I_5$ and generate second difference image $D_2$ by obtaining difference between second sub-sampled image $I_2$ and the reference sub-sampled image $I_5$. Similarly, difference image generator may generate difference images $D_3$ to $D_9$ by obtaining difference between the reference sub-sampled image $I_5$ and corresponding sub-sampled image. Such fifth sub-sampled image $I_6$ is not changed after inserting recovery features.

Embedding level generator 155 may generate an embedding level from a histogram of each difference image $D_k$ according to a length of a recovery feature. The embedding level may include a left embedding level $\Delta_L$ and a right embedding level $A_R$.

Difference image modificator 157 may obtain an empty bin at histogram of a difference image $D_k$ using the left embedding level $\Delta_L$ and the right embedding level $\Delta_R$ as illustrated in FIG. 5. For example, difference image modificator 157 may select empty bins, for example, −1, 0, and 1, 2, 3, from histogram of a difference image $D_k$ when $\Delta_L=2$ and $\Delta_R=3$ as illustrated in FIG. 5.

As described, apparatus 100 may extract the recovery feature from a digital image, embed the recovery feature into the digital image, and provide such a feature hidden image to a user for image authentication and integrity verification in accordance with embodiments of the present invention in accordance with embodiment of the present invention. Such an operation of apparatus 100 in accordance with embodiments of the present invention will be described with reference to FIG. 6 and FIG. 7.

Figure 6:
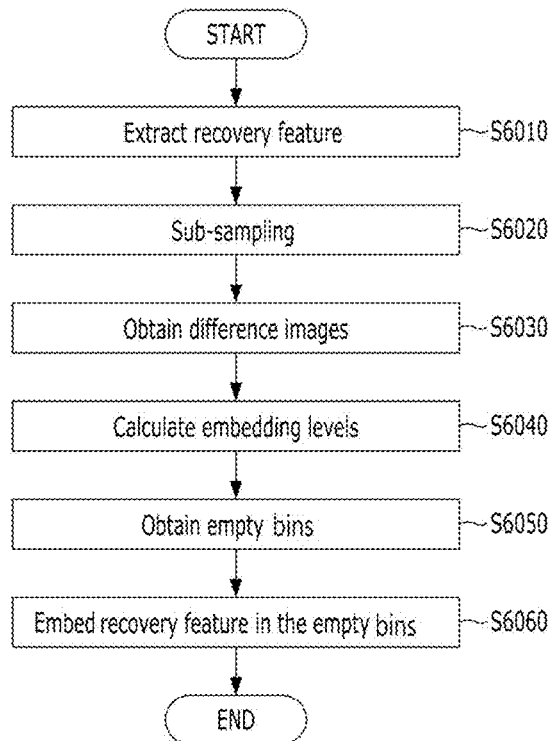
FIG. 6 shows a method of providing a digital image by embedding recovery feature in the digital image in accordance with embodiments of the present invention.
Figure 7:
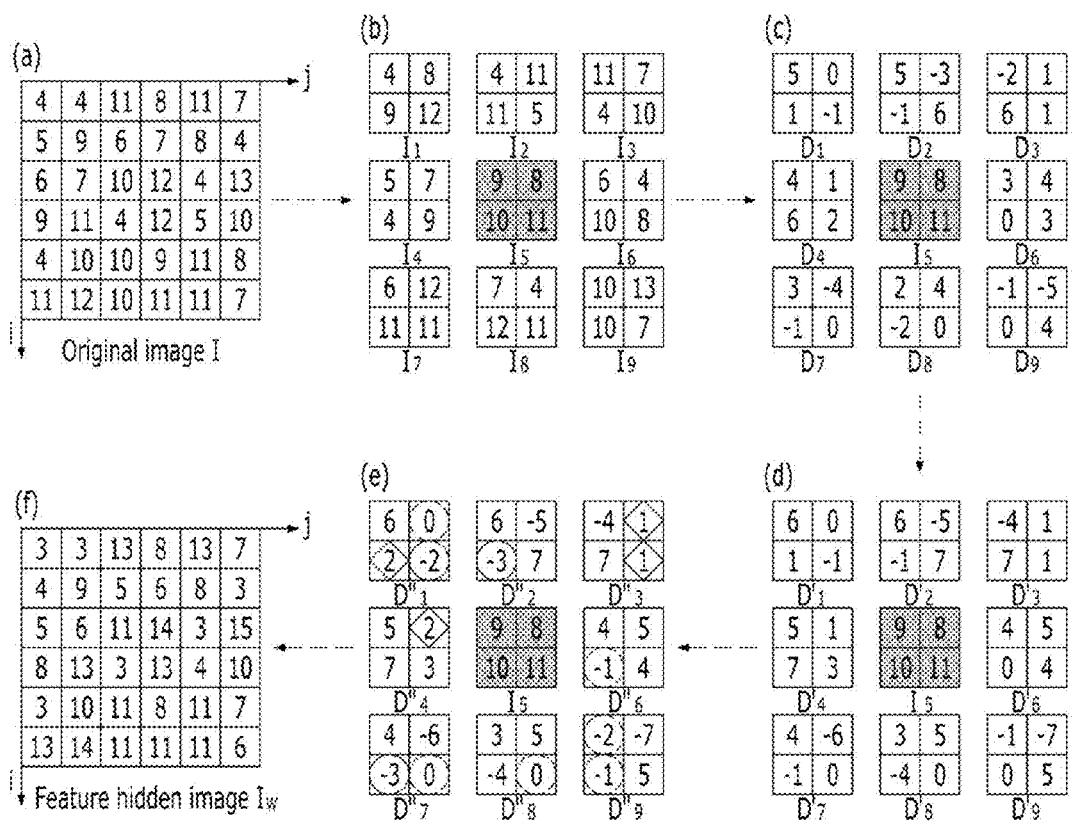
FIG. 7 shows embedding a recovery feature in accordance with embodiments of the present invention.

FIG. 6 shows a method of providing a digital image by embedding recovery feature in the digital image in accordance with embodiments of the present invention. FIG. 7 shows embedding a recovery feature in accordance with embodiments of the present invention.

Referring to FIG. 6, an original digital image may be received and recovery feature may be extracted from the received original digital image at step S6010. For example, extraction unit 130 may receive an original digital image I from input unit 110. Such an original image I is shown in a diagram (a) of FIG. 7. Extraction unit 130 may decompose the received original digital image I into a plurality of variable-sized blocks, as shown in a diagram (b) of FIG. 7. In order to decompose, extraction unit 130 may use quad-tree decomposition in accordance with embodiment of the present invention. Particularly, extraction unit 130 may i) divide the received original digital image I into four equal-sized blocks and ii) test each block to confirm whether all pixels in each block are within a specific dynamic range in order to meet the homogeneity criterion. If a block meets this criterion, extraction unit 130 iii) does not further divide the block. Otherwise, extraction unit 130 iv) sub-divides the block into four sub-blocks. Such decomposition may be shown in FIG. 3.

After the quad-tree decomposition, extraction unit 130 may calculate an average pixel value of each block as the recovery feature $R_n$. The average pixel value may be referred to as an average bit depth value of each block. The average pixel value may be binary data. The recovery feature may be expressed as Eq. 1 below.

$$R=\{R_1, R_2, \ldots, R_n, \ldots, R_N\}, \text{ where } R_n(b) \in \{0,1\},$$
$$1 \leq n \leq N, 1 \leq b \leq \text{bit depth} \qquad \text{Eq. 1}$$

In Eq. 1, R denotes the recovery feature of the received original digital image I. As shown, the recovery feature R may be a set of average pixel values of the blocks. That is, the recovery feature R may be a set of $R_n$, where $R_n$ is one of 0 and 1.

After obtaining the recovery feature of the received original digital image I, the recovery feature may be embedded in the received original digital image I. Such embedding process is performed as follows.

At step S6020, sub-sampling may be performed. For example, sub-sampling processor 151 of embedding unit 150 may receive the received original digital image I from input unit 110. Sub-sampling processor 151 may generate a plurality of sub-sampled images by performing sub-sampling on the received original digital image I in accordance with embodiments of the present invention. That is, the received original digital image I may be divided into a plurality of sub-sampled images through sub-sampling. For example, the original digital image I may be divided into nine sub-sampled images $I_1$ to $I_9$ as shown in a diagram (b) of FIG. 7.

Particularly, sub-sampling processor 151 may obtain nine sub-sampled images $I_1$ to $I_9$ from the $N_1 \times N_2$ original image I(i,j) using Eq. 2 below.

$$I(3i,3j)=I_1(x,y)I(3i,3j+1)=I_2(x,y)I(3i,3j+2)=I_3(x,y)$$

$$I(3i+1,3j)=I_4(x,y)I(3i+1,3j+1)=I_5(x,y)I(3i+1,3j+2)=I_6(x,y) \qquad \text{Eq. 2}$$

$$I(3i+2,3j)=I_7(x,y)I(3i+2,3j+1)=I_8(x,y)I(3i+2,3j+2)=I_9(x,y)$$

In Eq. 2, i denotes a horizontal coordinate value of the original digital image I, j denotes a vertical coordinate value of the original digital image I, x denotes a horizontal coordinate value of a sub-sampled image $I_k$, and y denotes a vertical coordinate value of a sub-sampled image $I_k$. When the original image I(i,j) has a size of $N_1 \times N_2$, i may be in a range of $(0, \ldots, N_1-1)$ and j may be in a range of $\{0, \ldots, N_2-1\}$. In addition, x may be in a range of $\{0, \ldots [N_1/3]-1\}$ and y may be in a range of $\{0, \ldots, [N_2/3]-1\}$.

At step S6030, difference images may be generated based on the sub-sampled images of the received original digital image I. For example, difference image generator 153 may generate difference images $D_k$ using the plurality of sub-sampled images $I_k$, which are received from sub-sampling processor 151. A diagram (C) of FIG. 7 shows the difference images $D_k$. For example, when the received original digital image I is divided into 9 sub-sampled images $I_1$ to $I_9$, difference image generator 153 may generate eight difference images $D_1$ to $D_4$ and $D_6$ to $D_9$ through Eq. 3 below. As described, difference image generator 153 may use the fifth sub-sampled image $I_5$ as a reference image. The fifth sub-sampled image may be an image not changed after embedding the recovery feature in the original digital image I.

$$D_k(x,y)=I_5(x,y)-I_k, \text{ where } I \leq k \leq 9 \text{ and } k \neq 5 \qquad \text{Eq. 3}$$

In Eq. 3, x denotes a horizontal coordinate value of a sub-sampled image $I_6$, y denotes a vertical coordinate value of a sub-sampled image $I_5$, and k denotes an index number of the fifth sub-sampled image 16 defined in Eq. 2.

At step S6040, embedding levels may be calculated. For example, embedding level generator 155 may calculate an embedding level from histogram of the obtained difference images $D_k$ according to a length of a recovery feature R received from extraction unit 130. That is, embedding level generator 155 may calculate a left embedding level $\Delta_L$ and a right embedding level $\Delta_R$ in order to create an empty bin for embedding the recovery feature R. The left and right embedding levels $\Delta_L$ and $\Delta_R$ indicate the number of bins selected around the histogram of the difference images. The occurrence (or frequencies) of the histogram of the difference images are proportional to the embedding capacity. For example, when the left and right embedding levels $\Delta_L$ and $\Delta_R$ are 2 and 3, respectively, the bins −1 and 0 are selected by the left embedding level $A_L$ and the bins 1, 2, and 3 are selected by the right embedding level $\Delta_R$ as shown in FIG. 5 in accordance with embodiments of the present invention.

At step S6050, an empty bin may be obtained for embedding the recovery feature in the original digital image. For example, difference image modificator 157 may obtain an empty bin by shifting histograms of difference images $D_k$ in left and right directions using the left and right embedding levels $\Delta_L$ and $A_R$. Particularly, difference image modificator 157 may generate first modified difference images $D_k'$ using the left and right embedding levels $\Delta_L$ and $\Delta_R$ as shown in a diagram (d) of FIG. 7. Difference image modificator 157 may use Eq. 4 below for generating the first modified difference images $D_k'$.

$$D'_k(x, y) = \begin{cases} D_k(x, y) - \Delta_L, & \text{if } D_k(x, y) \le -\Delta_L, \\ D_k(x, y) + \Delta_R, & \text{if } D_k(x, y) > \Delta_R, \\ D_k(x, y), & \text{otherwise} \end{cases} \quad \text{Eq. 4}$$

For example, when a value in $D_k(x,y)$ is less than or equal to $-\Delta_L$, difference image modificator 157 may change the value to $D_k'(x,y)=D_k(x,y)-\Delta_L$. Furthermore, when a value in $D_k(x,y)$ greater than $\Delta_R$, difference image modificator 157 may change the value to $D_k'(x,y)=D_k(x,y)+\Delta_R$. That is, when a value of $D_2(0,1)$ is about −3 and when $\Delta_L$ is 2, a modified histogram $D_2'(1,1)$ is about −5. When a value of $D_2(0,0)$ is about 5 and when $\Delta_R$ is 1, a modified histogram $D_2'(0,0)$ is about 6. While modifying the difference images, only the pixels in $I_k(x,y)$, wherein $1 \le k \le 9$ and $k \ne 5$ are changed. $I_5(x,y)$ is not changed for the reverse operation.

At step S6060, the recovery feature may be embedded into the obtained empty bins. For example, difference image modificator 157 may embed the extracted recovery feature in the original digital image using the obtained empty bins in accordance with embodiments of the present invention. That is, difference image modificator 157 may embed the recovery feature R into the empty bin of the first modified difference images $D_k'$.

Particularly, difference image modificator 157 may embed the recovery feature by generating second modified difference images $D_k''$, as shown in a diagram (e) of FIG. 7 in accordance with embodiments of the present invention. For example, difference image modificator 157 may modify the first modified difference images $D_k'$ to generate the $2^{nd}$ modified difference images $D_5''$. Difference image modificator 157 may use Eq. 5 and Eq. 6 below to generate the second modified difference images $D_k''$.

$$D''_k(x, y) = \begin{cases} D'_k(x, y) - \Delta_L, & \text{if } D'(x, y) = -(\Delta_L - 1) \text{ and } R_n(b) = 1 \\ D'_k(x, y) - (\Delta_L - 1), & \text{if } D'(x, y) = -(\Delta_L - 1) \text{ and } R_n(b) = 0 \end{cases} \quad \text{Eq. 5}$$

$$D''_k(x, y) = \begin{cases} D'_k(x, y) + \Delta_R, & \text{if } D'(x, y) = \Delta_R \text{ and } R_n(b) = 1 \\ D'_k(x, y) + (\Delta_R - 1), & \text{if } D'(x, y) = \Delta_R \text{ and } R_n(b) = 0 \end{cases} \quad \text{Eq. 6}$$

Eq. 5 may be used to generate the second modified difference image $D_k''$ using the left embedding level $\Delta_L$ and Eq. 6 may be used to generate the second modified difference image $D_k''$ using the right embedding level $\Delta_R$. Using Eq. 5 and Eq. 6, the second modified difference image $D_k''$ may be generated as follow. First, a negative (left) histogram of $D_k'$(x,y) is modified by considering the left embedding level $\Delta_L$. For example, when a value of D'(x,y) is equal to $-(\Delta_L-1)$, a recovery feature bit $R_n(b)$ to be embedded is checked. When the recovery reference bit $R_n(b)$ to be embedded is 1, a value of $D_k'(x,y)$ is changed to $D_5''(x,y)=D_k'(x,y)-\Delta_L$. When the recovery reference bit $R_n(b)$ to be embedded is 0, a value of $D_k'(x,y)$ is changed to $D_k''(x,y)=D_2'(x,y)=D_k'(x,y)-(\Delta_L-1)$. Subsequently, the left embedding level $\Delta_L$ decreases by 1. This process is performed for all the difference images until the left embedding level $\Delta_L$ becomes 0. Second, a positive (right) histogram of $D_k'(x,y)$ is modified by considering the right embedding level $\Delta_R$. For example, when a value of D'(x,y) is equal to the right embedding level $\Delta_R$, a recovery feature bit $R_n(b)$ to be embedded is checked. When the recovery reference bit $R_n(b)$ to be embedded is 1, a value of $D_k'(x,y)$ is changed to $D_k''(x,y)=D_k'(x,y)+\Delta_R$. When the recovery reference bit $R_n(b)$ to be embedded is 0, a value of $D_k'(x,y)$ is changed to $D_k''(x,y)=D_k'(x,y)+(\Delta_R-1)$. Subsequently, the right embedding level $\Delta_R$ decreases by 1. This process is performed for all the difference images until the right embedding level $\Delta_R$ becomes 0.

For example, when a recovery feature bit $R_a(b)$ to be embedded is 1, when a value of $D_2'(1,1)$ is −1, and when the left embedding level $\Delta_L$ is 2, $D_2''(1,1)$ may be −3 by Eq. 5. For another example, when information $R_n(b)$ to be embedded is 1, when a value of $D_4'(0,1)$ is −1, and when the right embedding level $\Delta_R$ is 1, $D_4''(0,1)$ may be 2 by Eq. 6.

As described above, the second modified difference image $D_k''$ may be generated by embedding the recovery feature R into the empty bin of the first modified difference image $D_k'$. The generated second modified difference image $D_k''$ may be output to output unit 170.

Such a recovery feature embedding procedure in accordance with embodiments of the present invention is described in FIG. 7. For example, diagrams (a) to (f) of FIG. 3 shows a recovery feature embedding process when left and right embedding levels $\Delta_L$ and $\Delta_R$ are set to 1 and 2. Circles denote the left embedding level and show the positions of pixel values modified by Eq. 5. As a result, the negative histogram is modified. Diamonds denote the right embedding level and show the positions of the pixels values modified by Eq. 6. As a result, the positive histogram is modified. The embedded feature bits R are "0110 01001 1001". Nine sub-sampled images are generated using Eq. 2 as shown in a diagram (b) of FIG. 7. Eight difference images are generated using Eq. 3 as shown in a diagram (c) of FIG. 7. According to the embedding levels, a pixel in $D_k(x,y)$ is modified. The objective of such modification is to generate several empty bins in the histogram of the difference image in order to hide the recovery feature. Only those pixels in $D_k(x,y)$ whose values are greater than the right embedding level or lesser than or equal to the left embedding level are changed. The rest of the pixel values remain unchanged. For example, the first four bits "0110" of the recovery feature may be embedded into blocks indicated by a solid line circle of a diagram (e) of FIG. 7. Corresponding values of the blocks with the solid line circle may be changed to −2 or −3 as shown in the diagram (e) of FIG. 7. The second five bits "01001" may be embedded into blocks with a dotted line circle of a diagram (e) of FIG. 7. Corresponding values of the blocks with the dotted line circle may be changed to 0 or −1. The last four bits "1001" may be embedded into blocks indicated by a solid line diamond of a diagram (e) of FIG. 7. Corresponding values of the blocks with the diamond may be changed to 1, −2, and 2, as shown in the diagram (e) of FIG. 7.

Output unit 170 may finally output a final image $I_w$ as shown in a diagram (f) of FIG. 7. The final image $I_w$ may include the recovery feature R and be referred to as a feature hidden image. Particularly, the feature hidden image $I_w$ through the inverse of the sub-sampling with the unmodified reference sub-sampled image and modified sub-sampled images. Such feature hidden image may be provided or distributed to users. When the feature hidden image is provided, information on the left and right embedding levels $\Delta_L$ and $\Delta_R$ may be provided together in order to enable a receiving side for extraction of the embedded feature and for restoration of the original image.

Figure 8:
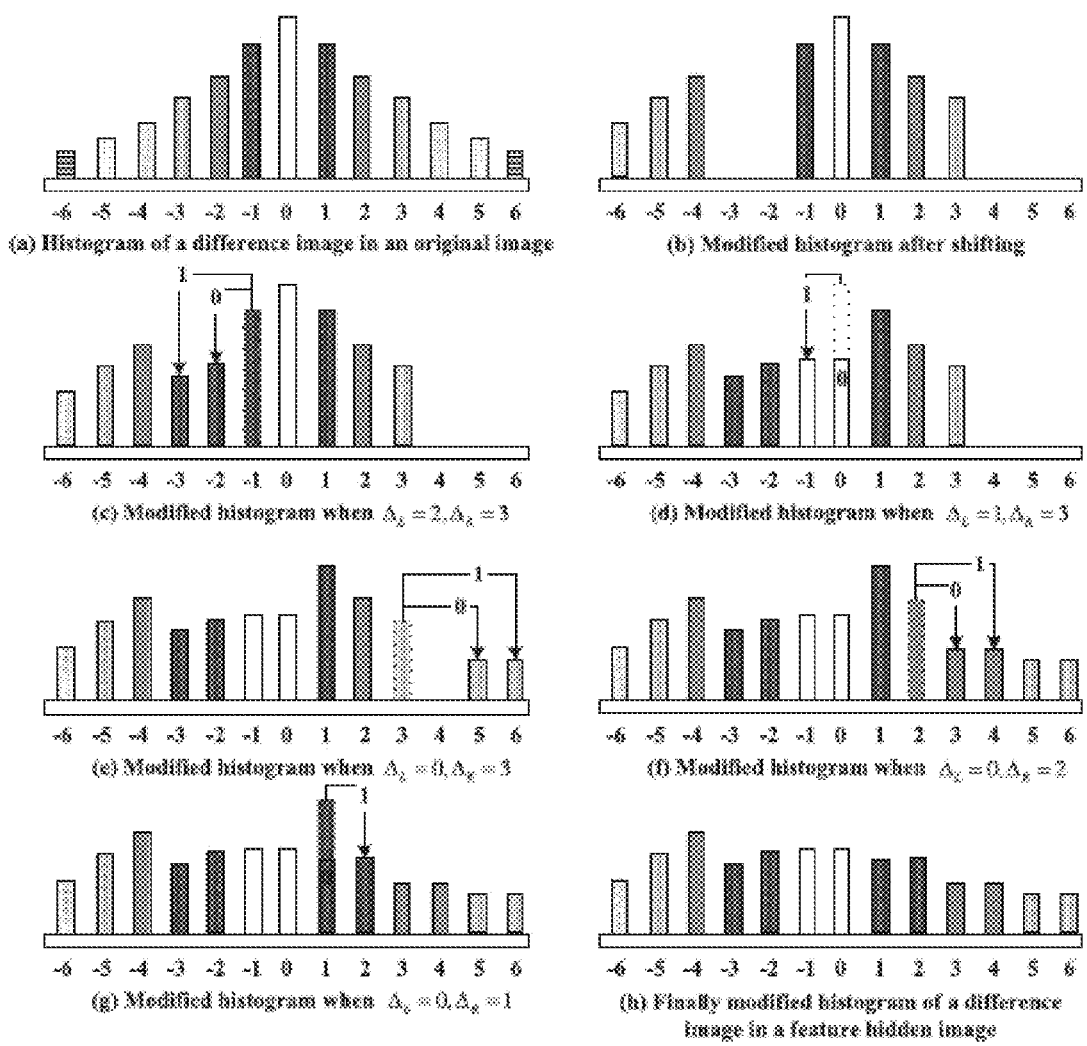
FIG. 8 shows modification in histogram of a difference image in accordance with embodiments of the present invention.

FIG. 8 shows a modification in histogram of a difference image in accordance with embodiments of the present invention.

A diagram (a) of FIG. 8 shows a histogram of a difference image $D_k$ generated by difference image generator 153. A diagram (b) of FIG. 8 shows the histogram shifted (or modified) by applying a histogram shifting scheme on the difference image $D_k$. Shifting may be performed using left and right embedding levels $\Delta_L$ and $\Delta_R$.

A diagram (c) of FIG. 8 shows a modified histogram when the left embedding level $\Delta_L$ is 2 and the right embedding level $\Delta_R$ is 3. A diagram (d) of FIG. 8 shows histogram modified when the left embedding level $\Delta_L$ is 1 and the right embedding level $\Delta_R$ is 3. A diagram (e) of FIG. 8 shows modified histogram when the left embedding level $\Delta_L$ is 0 and the right embedding level $\Delta_R$ is 3. A diagram (f) of FIG. 8 shows modified histogram when the left embedding level $\Delta_L$ is 0 and the right embedding level $\Delta_R$ is 2. A diagram (g) of FIG. 8 shows modified histogram when the left embedding level $\Delta_L$ is 0 and the right embedding level $\Delta_R$ is 1.

A diagram (h) of FIG. 8 shows histogram of a final image $I_w$, which is output from output unit 170. The final image $I_w$ may be embedded with the recovery feature R.

As described above, apparatus 100 may extract a recovery feature from an original digital image and embed the extracted recovery feature in the original digital image for image authentication and integrity verification in accordance with embodiments of the present invention. Furthermore, apparatus 100 may provide such a feature hidden image to users in accordance with embodiments of the present invention. When apparatus 100 provides such a feature hidden image, information on embedding levels may be provided together.

At a receiving side, apparatus 200 may receive a digital image, detect a recovery feature embedded in the received digital image, and verify whether the received digital image is tampered with or not in accordance with embodiments of the present invention. Then, apparatus 200 may perform a restoring procedure to conceal errors that occurred in the recovery information in accordance with embodiments of the present invention.

Such apparatus 100 and apparatus 200 may be a medical imaging device and a satellite imaging device, which require high quality imaging services. Hereinafter, apparatus 200 will be described with reference to FIG. 9 to FIG. 14.

Figure 9:
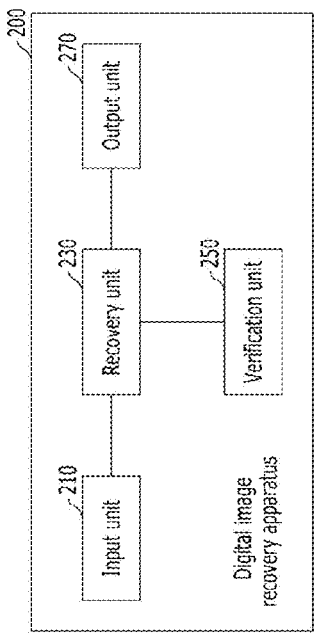
FIG. 9 shows an apparatus for detecting a tampered digital image and restoring an original digital image by recovering a tampered region in accordance with embodiments of the present invention.

FIG. 9 shows an apparatus for detecting a tampered digital image and restoring an original digital image by recovering a tampered region in accordance with embodiments of the present invention.

Referring to FIG. 9, apparatus 200 may receive a digital image embedded with a recovery feature, detect a tampered digital image, and restore the original digital image by recovering the tampered digital image in accordance with embodiments of the present invention. For example, apparatus 200 may extract the embedded recovery information from the received digital image and verify whether the received digital image is tampered with or not. When the received digital image is tampered, a restoring procedure is performed. When the received digital image is not tampered, apparatus 200 may restore an original image from the feature hidden image in accordance with embodiments of the present invention. Apparatus 200 may include input unit 210, recovery unit 230, verification unit 250, and output unit 270.

Input unit 210 may receive an image $I_w$ from an external device such as apparatus 100 for providing a feature hidden image. Accordingly, the received image $I_w$ may be a digital image embedded with a recovery feature R. For convenience and ease of understanding, the image $I_w$ may be referred to as a feature hidden image.

Recovery unit 230 may extract first recovery feature $R_1$ from the received feature hidden image $I_w$ using a lossless data detection scheme and restore an original image from the feature hidden image based on the extracted first recovery feature $R_1$. The original image may denote an image before a recovery feature is embedded.

Verification unit 250 may verify whether the feature hidden image is tampered with or not in accordance with embodiments of the present invention. In order to verify, verification unit 250 may compare the first recovery feature $R_1$ extracted from the received feature hidden image with a second recovery feature $R_2$ extracted from the restored original image. Such second recovery feature $R_2$ may be extracted using quad-tree decomposition similar to the first recovery feature $R_1$.

For example, when the first recovery feature $R_1$ is identical to the second recovery feature $R_2$, verification unit 250 may determine that the feature hidden image is not tampered. That is, the integrity of the feature hidden image may be verified. When the first recovery feature $R_1$ is not identical to the second recovery feature $R_2$, verification unit 250 may determine that the feature hidden image is tampered. In this case, recovery unit 230 may recover the tampered region of the feature hidden image using the first recovery feature $R_1$.

Output unit 270 may output the original image I restored from the feature hidden image $I_w$ when verification unit 250 determines that the received digital image is not tampered. Output 270 may output a recovered image by recovering a tampered region of the feature hidden image $I_w$ when verification unit 250 determines that the received digital image is tampered.

Figure 10:
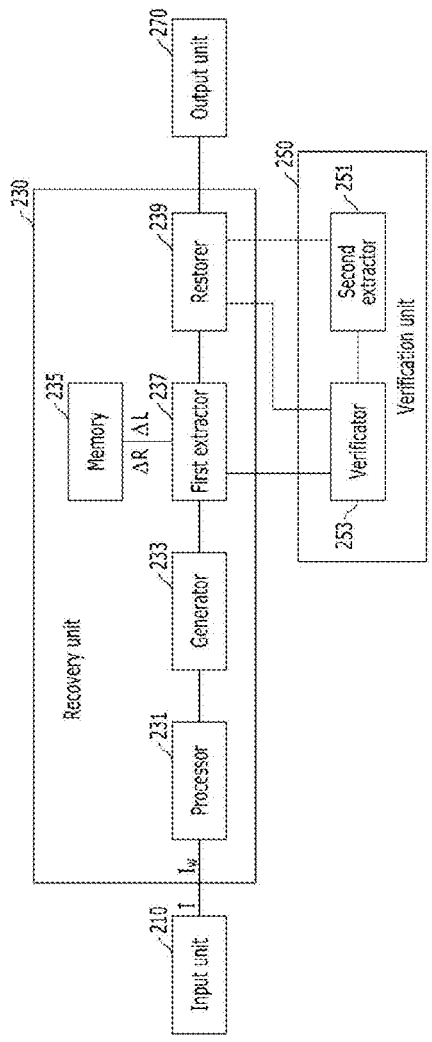
FIG. 10 shows a recovery unit and a verification unit of FIG. 9 in accordance with embodiments of the present invention.

FIG. 10 shows a recovery unit and a verification unit of FIG. 9 in accordance with embodiments of the present invention.

Referring to FIG. 10, recovery unit 230 may extract the first recovery feature and restore an original image from the received feature hidden image by removing the first recovery feature. Such recovery unit 230 may include processor 231, generator 233, memory 235, first extractor 237, and restorer 239.

Processor 231 is connected to input unit 210 and generator 233. Processor 231 may be provided with the received feature hidden image from the input unit 210. Processor 231 may generate sub-sampled images by performing sub-sampling on the received feature hidden image. Processor 231 may provide the sub-sampled images to generator 233.

Generator 233 is connected to first extractor 237. Generator 233 may generate a plurality of difference images.

First extractor 237 is connected to memory 235 and restorer 239 in recovery unit 230. First extractor 237 may extract the first recover feature from the difference images using embedding levels. In addition, first extractor 237 is connected to verificator 253 of verification unit 250 and provides the extracted first recover feature.

Restorer 239 may be connected to output unit 270. In addition, restorer 239 is connected to second extractor 251 and verificator 253 in verification unit 250. Restorer 239 may remove the extracted first recovery feature from difference images. In order to remove the first recovery feature, restorer 239 may generate first modified difference images by modifying the difference images. Such operation for generating first modified difference images will be described in detail with reference to FIG. 11.

Verification unit 250 may include second extractor 251 and verificator 253. Second extractor 251 may extract second recovery feature from the restored original image using quad-tree decomposition. Verificator 253 may receive the first recovery feature from first extractor 237 and compare the first recovery feature with the second recovery feature. When the first recovery feature is not identical to the second recovery feature, verificator 253 may determine that the received digital image is tampered. Otherwise, verificator 253 may determine that the received digital image is not tampered.

Hereinafter, a method for detecting a tampered digital image and recovering the tampered digital image in accordance with embodiments of the present invention will be described with reference to FIG. 11 and FIG. 12.

Figure 11:
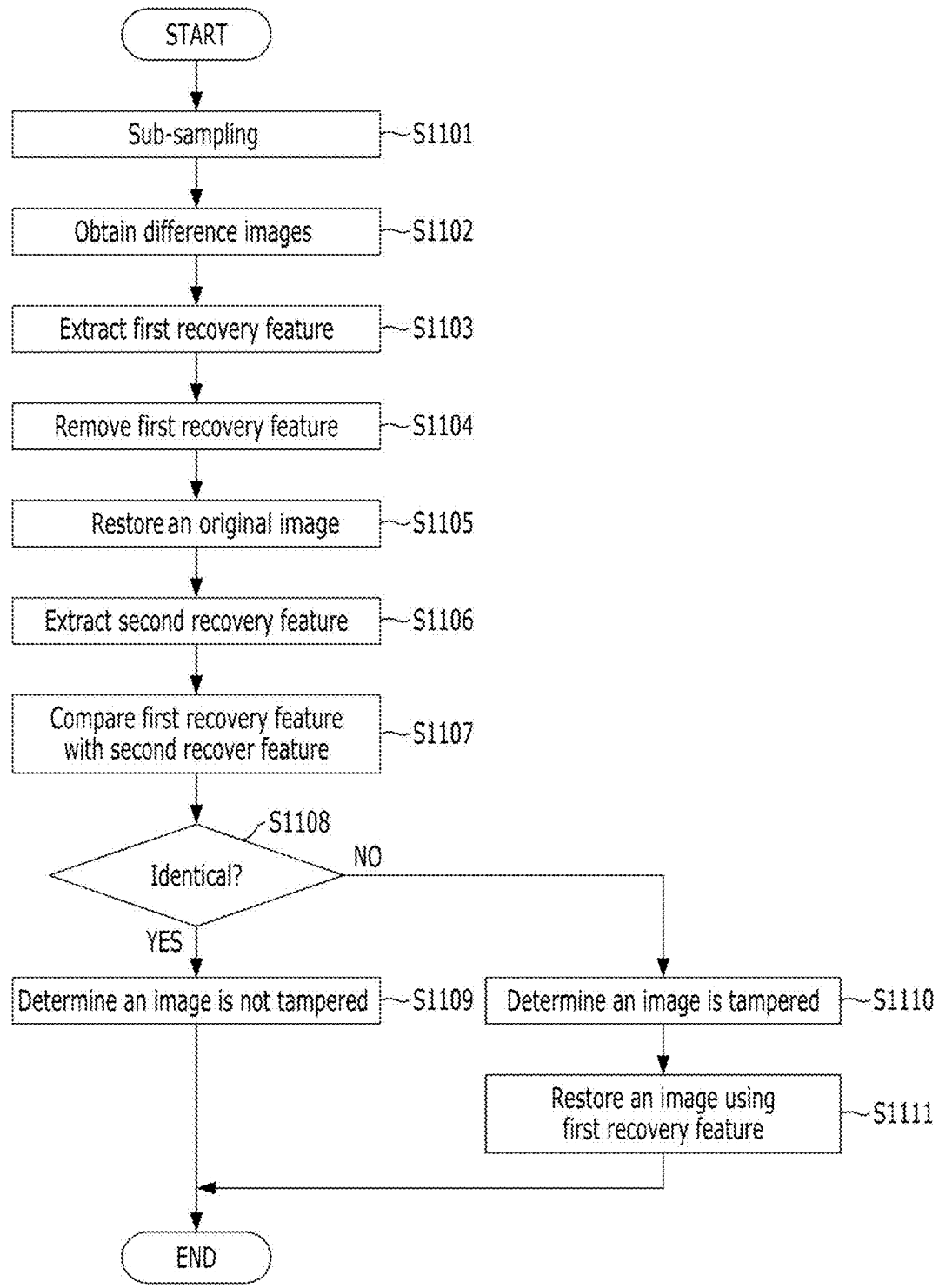
FIG. 11 shows a method for detecting and recovering a tampered digital image in accordance with embodiments of the present invention.
Figure 12:
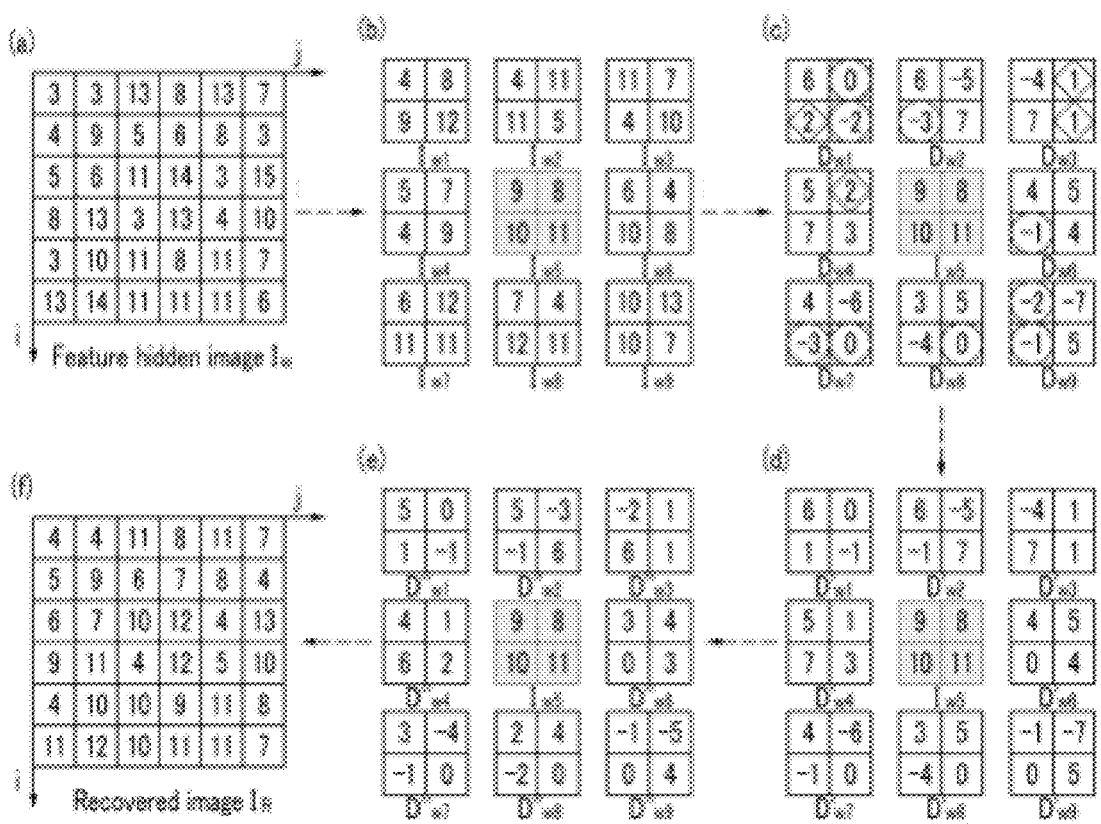
FIG. 12 shows extracting recovery feature from a feature hidden image in accordance with embodiments of the present invention.

FIG. 11 shows a method for detecting and recovering a tampered digital image in accordance with embodiments of the present invention. FIG. 12 shows extracting recovery feature from a feature hidden image in accordance with embodiments of the present invention.

Referring to FIG. 11, sub-sampling may be performed on a received digital image at step S1101. For example, apparatus 200 may receive a digital image from an external device such as apparatus 100. For convenience and ease of understanding, the received digital image is assumed as a feature hidden image created by apparatus 100 in accordance with embodiments of the present invention. After receiving, processor 231 of recovery unit 230 may generate nine sub-sampled images $I_{w1}$ to $I_{w2}$ by performing sub-sampling on a received image $I_w$.

The received image $I_w$ may be an image embedded with reference feature R, such as a feature hidden image. A diagram (a) of FIG. 12 shows the received image $I_w$ which is the feature hidden image. A diagram (b) of FIG. 12 shows nine sub-sampled images $I_{w1}$ to $I_{w2}$. Processor 231 may divide the feature hidden image $I_w$ into nine sub-sampling images $I_{w1}$ to $I_{w2}$ by performing sub-sampling using Eq. 2.

At step S1102, difference images $D_{wk}$ may be generated based on the sub-sampled images $I_{w1}$ to $I_{w2}$. For example, generator 233 of recovery unit 230 may obtain eight first difference images $D_{wk}$ from the sub-sampled images $I_{w1}$ to $I_{w2}$. Eq. 7 below may be used to obtain 8 first difference images $D_{wk}$ from the sub-sampled images $I_{w1}$ to $I_{w2}$.

$$D_{wk}(x,y)=I_{w5}(x,y)-I_{wk}, \text{ where } I \leq k \leq 9 \text{ and } k \neq 5 \quad \text{Eq. 7}$$

At step S1103, first recovery feature $R_n(b)$ embedded in the feature hidden image may be extracted from the first difference images $D_{wk}$. For example, first extractor 237 of recovery unit 230 may extract first recovery feature $R_n(b)$ from the first difference images $D_{wk}$ using left and right embedding levels $\Delta_L$ and $\Delta_R$. The left and right embedding levels $\Delta_L$ and $\Delta_R$ may be stored in memory 235, but the present invention is not limited thereto. Such left and right embedding levels $\Delta_L$ and $\Delta_R$ may be identical to those described in FIG. 1 to FIG. 8. That is, digital image providing apparatus 100 and digital image recovering apparatus 200 may share the same left and right embedding levels $\Delta_L$ and $\Delta_R$. For example, digital image providing apparatus 100 may provide information on left and right embedding levels $\Delta_L$ and $\Delta_R$ with the feature hidden image to digital image recovering apparatus 200.

Extracting the first recovery feature $R_n(b)$ from the first difference images $D_{wk}$ may be expressed as Eq. 8 and Eq. 9 below.

$$R_n(b) = \begin{cases} 0, & \text{if } D_{wk}(x,y) = -(2 \cdot \Delta_L - 2) \\ 1, & \text{if } D_{wk}(x,y) = -(2 \cdot \Delta_L - 1) \end{cases} \quad \text{Eq. 8}$$

$$R_n(b) = \begin{cases} 0, & \text{if } D_{wk}(x,y) = 2 \cdot \Delta_R - 1 \\ 1, & \text{if } D_{wk}(x,y) = 2 \cdot \Delta_R \end{cases} \quad \text{Eq. 9}$$

Eq. 8 uses a left embedding level $\Delta_L$ to extract the first recovery feature and Eq. 9 uses a right embedding level $\Delta_R$ to extract the first recovery feature. First, the recovery feature $R_n(b)$ is extracted from a negative histogram of $D_{wk}(x,y)$ using the left embedding level $\Delta_L$. Once a pixel with a difference value of $-(2 \cdot \Delta_L - 1)$ is encountered, a bit 1 is retrieved. When the pixel with a difference value of $-(2 \cdot \Delta_L - 2)$ is encountered, a bit 0 is retrieved. Subsequently, the left embedding level decreases by 1. This process is performed for all the difference images until the left embedding level $\Delta_L$ becomes 0. Second, $R_n(b)$ is extracted from a positive histogram of the $D_{wk}(x,y)$ using a right embedding level $\Delta_R$. Once a pixel with a difference value of $2 \cdot \Delta_R$ is encountered, a bit 1 is retrieved. When a pixel with a difference value of $2 \cdot \Delta_R - 1$ is encountered, a bit 0 is retrieved. Subsequently, the right embedding level $\Delta_R$ decreases by 1. Similarly, this process is performed for all the difference images until the right embedding level $\Delta_R$ becomes 0. For example, when a value of $D_{w1}(1,1)$ is $-2$ and when a value of the left embedding level $\Delta_L$ is 2, a binary number of 0 is extracted. For another example, when a value of $D_{w3}(0,1)$ is 2 and a value of the right embedding level $\Delta_R$ is 1, a binary number of 1 is extracted. The first recovery feature $R_n(b)$ may be extracted by applying such a procedure on all first difference images $D_{wk}$.

At step S1104, the extracted first recovery feature $R_n(b)$ may be removed. For example, restorer 239 of recovery unit 230 may generate first modified difference images $D_{wk}'$ by removing the first recovery feature $R_n(b)$ from the difference images $D_{wk}$. A diagram (d) of FIG. 12 shows the first modified difference images $D_{wk}'$. Particularly, left and right embedding levels $\Delta_L$ and $\Delta_R$ are initialized to 0 and increases by 1 after each step. This process is performed for all the difference images until the left and right embedding levels $\Delta_L$ and $\Delta_R$ are the same as the embedding levels already known. Eq. 10 below may present first modified difference images $D_{wk}'$ generated by removing the recovery feature using the left embedding level $\Delta_L$.

$$D_{wk}'(x,y) = \begin{cases} D_{wk}(x,y) - (\Delta_L - 1), & \text{if } D_{wk}(x,y) = -(2 \cdot \Delta_L - 2) \\ D_{wk}(x,y) - \Delta_L, & \text{if } D_{wk}(x,y) = -(2 \cdot \Delta_L - 1) \end{cases} \quad \text{Eq. 10}$$

Eq. 11 below may present first modified difference images $D_{wk}'$ generated by removing the recovery feature using the right embedding level $\Delta_R$.

$$D_{wk}'(x,y) = \begin{cases} D_{wk}(x,y) + (\Delta_R - 1), & \text{if } D_{wk}(x,y) = 2 \cdot \Delta_R - 1 \\ D_{wk}(x,y) + \Delta_R, & \text{if } D_{wk}(x,y) = 2 \cdot \Delta_R \end{cases} \quad \text{Eq. 11}$$

For example, when a value of $D_{w1}(1,1)$ M is $-2$ and when a value of the left embedding level $\Delta_L$ is 2, a value of first modified difference image $D_{wk}'(1,1)$ is $-1$. For another example, when a value of $D_{w3}(0,1)$ is 2 and when a value of the right embedding level $\Delta_R$ is 1, a value of first modified difference image $D_{wk}'(1,1)$ is 1. The first modified difference images $D_{wk}'$ may be obtained by applying such a procedure on all first difference images $D_{wk}$.

At step S1105, an original image may be restored from the first modified difference images. For example, restorer 239 of recovery unit 230 may restore an original image $I_R$ from the first modified difference images $D_{wk}'$. In order to restore the original image $I_R$, restorer 239 may remove empty bins of histograms of difference images using the left and right embedding levels $\Delta_L$ and $\Delta_R$. The empty bins are created to embed the recovery feature in the original digital image. In order to recover the empty bins, restorer 239 may generate second modified difference images $D_{wk}''$ from the first modified difference images $D_{wk}'$. Eq. 12 below may represent generating the second modified difference images $D_{wk}''$ from first modified difference images $D_{wk}'$.

$$D''_{wk}(x, y) = \begin{cases} D'_{wk}(x, y) - \Delta_L, & \text{if } D'_{wk}(x, y) \le -2 \cdot \Delta_L \\ D'_{wk}(x, y) + \Delta_R, & \text{if } D'_{wk}(x, y) > 2 \cdot \Delta_R \\ D'_{wk}(x, y), & \text{otherwise} \end{cases} \quad \text{Eq. 12}$$

For example, when a value of $D_{w3}'(0,0)$ is −4 and when a value of the left embedding level $\Delta_L$ is 2, a value of second modified difference image $D_{w3}''(0,0)$ is −2. For another example, when a value of $D_{w3}'(0,0)$ is 3 and a value of the right embedding level $\Delta_R$ is 1, a value of second modified difference image $D_{w3}''(0,0)$ is 2.

The second modified difference images $D_{wk}''$ may be generated by performing the procedure for all first modified difference images $D_{wk}'$. In addition, the restored original image $I_R$ may be obtained from the second modified difference images $D_{wk}''$. That is, the restored original image $I_R$ may be obtained through the inverse of sub-sampled images with the unmodified reference sub-sampled image and the modified sub-sampled images. After restoration, the restored original digital image $I_R$ may be transferred to second extractor 215 of verification unit 250.

At step S1106, second recovery feature R may be extracted from the restored original image $I_R$. For example, second extractor 251 of verification unit 250 may extract second recovery feature R from the restored original image $I_R$ using quad-tree decomposition. Since such extraction of recovery feature using the quad-tree decomposition is already described, the detail description thereof is omitted herein.

At step S1107, the second recovery feature may be compared with the first recovery feature. The first recovery feature is the recovery feature extracted from the feature hidden image $I_w$ and the second recovery feature is the recovery feature extracted from the restored original image $I_R$. Particularly, verificator 253 of verification unit 250 may receive such second recovery feature from second extractor 251 and compare the second recovery feature with the first recovery feature through bitwise operation.

At step S1108, determination may be made as to whether the second recovery feature is substantially identical to the first recovery feature. For example, verificator 253 of verification unit 250 may determine whether the first recovery feature and the second recovery feature are identical.

When the first recovery feature is identical to the second recovery feature (Yes—S1108), determination is made that the received feature hidden image is not tampered at step S1109. For example, verificator 253 may determine that the integrity of the image is verified because the received hidden image $I_w$ is not tampered.

When the first recovery feature is not identical to the second recovery feature (No—S1108), determination is made that the received feature hidden image is tampered at step S1110. For example, verificator 253 may determine that the integrity of the image is failed because the feature hidden image $I_w$ is tampered. As described, verificator 253 of verification unit 250 may determine whether the received hidden feature image $I_w$ is tampered or not.

At step S1111, the tampered hidden feature image $I_w$ may be recovered using the first recovery feature. For example, restorer 239 of recovery unit 230 may find locations of different bits in the restored original image $I_R$. The locations of the different bits in the restored original image $I_R$ may be a tampered region. Verificator 253 of verification unit 250 may recover the tampered region based on an average value of a corresponding block from the first recovery feature. Verificator 253 may transfer the recovered image to output unit 270.

As described above, histogram of difference images may be modified to recover empty bins from the difference images. Such histogram modification is shown in FIG. 13.

Figure 13:
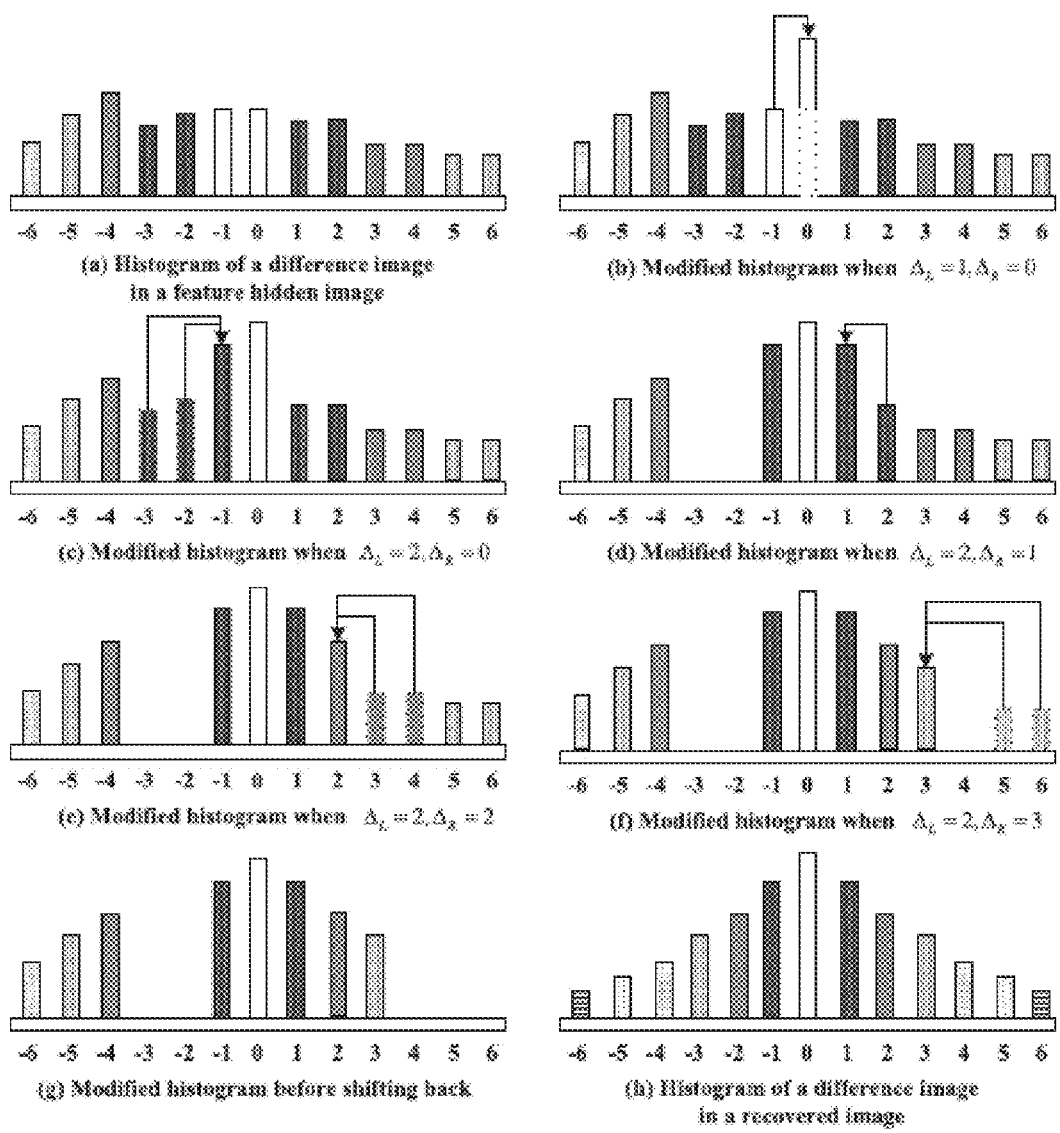
FIG. 13 shows histogram modification in a restoration procedure in accordance with embodiments of the present invention.

FIG. 13 shows histogram modification in a restoration procedure in accordance with embodiments of the present invention.

A diagram (a) shows histogram of difference images $D_k$ generated by extractor 237 of recovery unit 230. Diagrams (b) to (f) of FIG. 13 shows histograms modified using embedding levels.

For example, the diagram (b) shows a histogram modified when a left embedding level $\Delta_L$ is 1 and a right embedding level $\Delta_R$ is 0. The diagram (c) shows a histogram modified when a left embedding level $\Delta_L$ is 2 and a right embedding level $\Delta_R$ is 0. The diagram (d) shows a histogram modified when a left embedding level $\Delta_L$ is 2 and a right embedding level $\Delta_R$ is 1. The diagram (e) shows a histogram modified when a left embedding level $\Delta_L$ is 2 and a right embedding level $\Delta_R$ is 2. The diagram (f) shows a histogram modified when a left embedding level $\Delta_L$ is 2 and a right embedding level $\Delta_R$ is 3.

Diagram (g) of FIG. 13 shows a histogram before modification as shown in the diagrams (b) to (f) of FIG. 13. A diagram (h) of FIG. 13 shows histogram of the recovered image $I_R$ after a tampered region thereof is recovered, which is finally output from output unit 270.

Hereinafter, a simulation result for verifying performance in detection and recovery of tempered image in accordance with embodiments of the present invention will be described with reference to FIG. 14 to FIG. 27.

Figure 14:
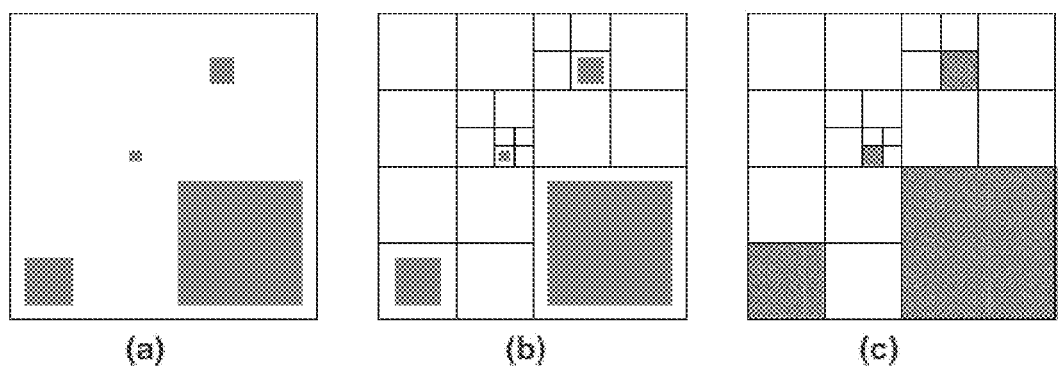
FIG. 14 shows detecting a tampered region from an image and recovering a tampered region in accordance with embodiments of the present invention.

FIG. 14 shows detecting a tampered region from an image and recovering a tampered region in accordance with embodiments of the present invention.

Diagram (a) of FIG. 14 shows tampered regions of an image. A diagram (b) of FIG. 14 shows a result of applying quad-tree decomposition on the image. Diagram (c) of FIG. 14 shows a result of detecting the tampered regions.

Referring to FIG. 14, a detected tampered region and a restored region may form a square shape because the characteristics of the quad-tree decomposition regardless of a shape of a tampered region.

A mid-frequency area and a high frequency area are divided into further smaller blocks in the quad-tree decomposition in accordance with embodiments of the present invention. When such a mid-frequency area and a high frequency area are tampered, the tampered regions may be further accurately recovered.

Figure 15:
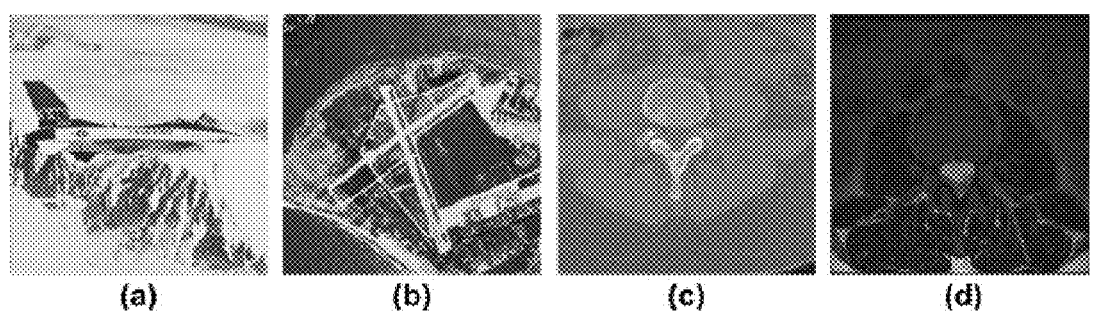
FIG. 15 shows four test images used for evaluating performance in detecting and recovering a tampered region of a digital image in accordance with embodiments of the present invention.

FIG. 15 shows four test images used for evaluating performance in detecting and recovering a tampered region of a digital image in accordance with embodiments of the present invention.

The performance of detecting and recovering a tampered region of a digital image in accordance with embodiments of the present invention is evaluated in terms of reversibility and tampering restoration ability. The evaluation results are compared with the performance of a tamper detection and restoring system for medical images which is introduced by K, H, Chiang et al. in Journal of Digital Imaging 21 (2008) 77-90. The tamper detection and restoring system of Chiang uses wavelet-based reversible data embedding and differential expansion to detect and restore tampered digital image. The performance of detecting and recovering a tampered region is evaluated as follows. 1) After generating a feature hidden image by embedding a recovery feature and a length (bit) of the recovery feature in a digital image, a peak signal to noise ratio (PSNR) of the feature hidden image is measured. 2) After detecting and recovering a tampered image, a PSNR and a structural similarity (SSIM) of the recovered image is measured. The PSNR may be an objective reference of evaluating quality and the SSIM may be a subjective reference for evaluating quality. The PSNR may be calculated using Eq. 13 below.

$$PSNR = 10 \times \log_{10}\left(\frac{L}{MSE}\right), \text{ where} \qquad \text{Eq. 13}$$

$$MSE = \frac{1}{N_1 N_2} \sum_{i=1}^{N_1} \sum_{j=1}^{N_2} \|W(i,j) - I(i,j)\|^2$$

In Eq. 13, W represents an image embedded with recovery feature, referred to as a feature embedded image. I represents an original image. L represents $2^B-1$ where B is a bit depth of a pixel value. For example, when the pixels are represented using 16 bits, the numerator of PSNR is $2^{16}-1=65535$. $N_1$ and $N_2$ respectively represent a horizontal pixel size and a vertical pixel size. In addition, the SSIM may be calculated using Eq. 14 below.

$$SSIM = \frac{(2\mu_W \mu_1 + c_1)(2\text{cov}\mu_{W1}\mu_1 + c_2)}{(\mu_W^2 + \mu_1^2 + c_1)(\sigma_W^2 + \sigma_I^2 + c_2)}, \text{ where} \qquad \text{Eq. 14}$$

$$c_1 = (k_1 L)^2, \, c_2 = (k_2 L)^2$$

In Eq. 14, µ represents an average value of an image and $\sigma^2$ represents a covariance of the image; the value $\text{cov}_{WI}$ represents covariance of a feature hidden image W and an original image I; and $k_1$ and $k_2$ respectively represent constants, which might be changed. In this exemplary evaluation, $k_1$ and $k_2$ are respectively set to about 0.01 and about 0.03.

For the PSNR metric, a high value thereof means a high quality. For the SSIM metric, the resultant SSIM value lies between −1 and 1, and 1 implies that the two images are identical.

FIG. 16 to FIG. 23 shows comparison between a restoration result of a typical detection and recovery method and that of a detection and recovery method in accordance with embodiments of the present invention.

Figure 16:
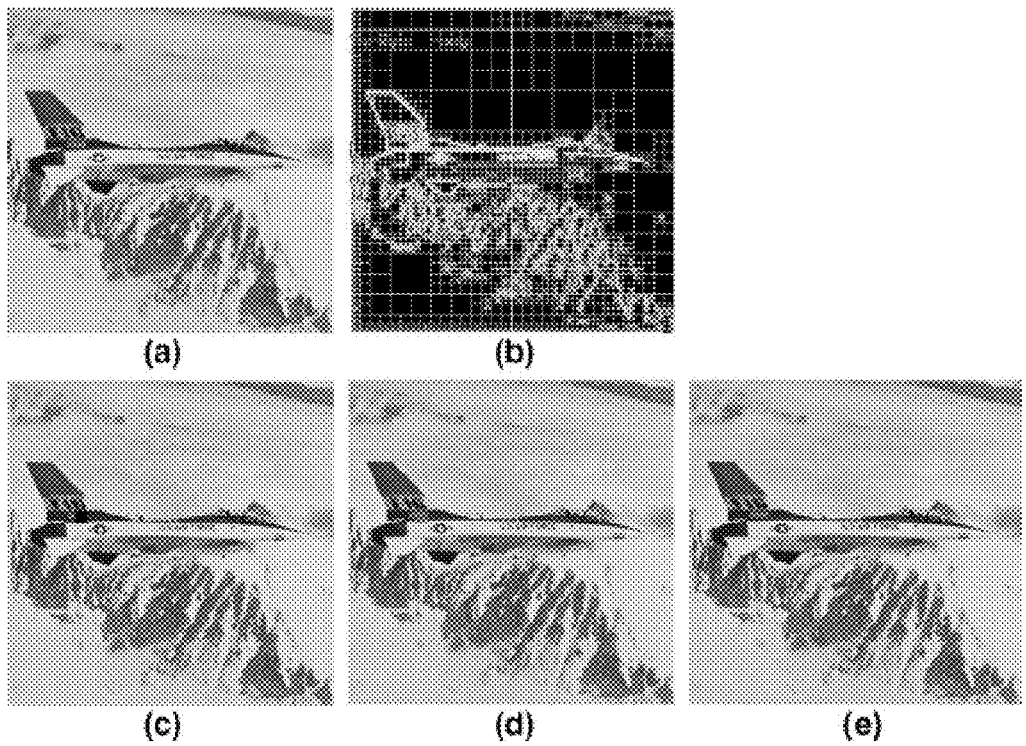
FIG. 16 to FIG. 23 shows comparison between a restoration result of a typical detection and recovery method and that of a detection and recovery method in accordance with embodiments of the present invention.

Referring to FIG. 16, diagram (a) is an original image and a diagram (b) is an image generated by applying quad-tree decomposition on the original image. Diagram (c) is a tampered image and a diagram (d) is a restored image using a typical method of Chiang, which is introduced by K, H, Chiang et al. in Journal of Digital Imaging 21 (2008) 77-90. Diagram (e) is a restored image using a detection and recovery method in accordance with embodiments of the present invention.

Figure 17:
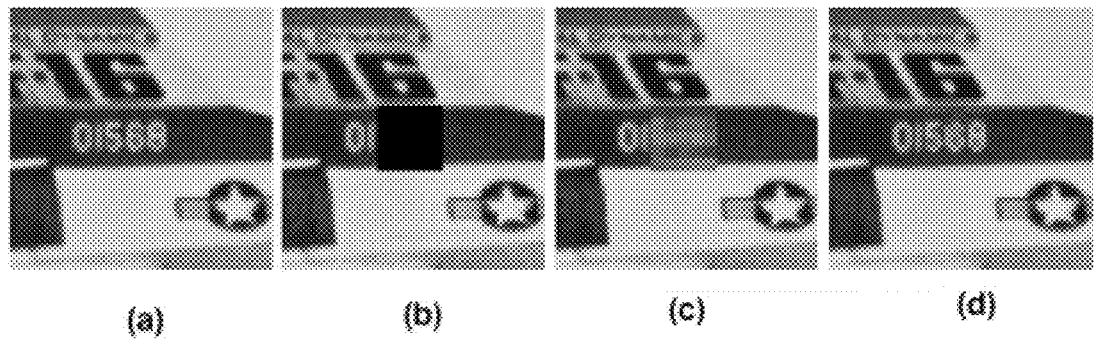

Referring to FIG. 17, diagram (a) is an area of interest in the original image of FIG. 16 and diagram (b) is a tampered area of FIG. 16. Diagram (c) is an area restored by a typical method of Chiang and diagram (d) is an area restored by the detection and recovery method in accordance with embodiments of the present invention.

Figure 18:
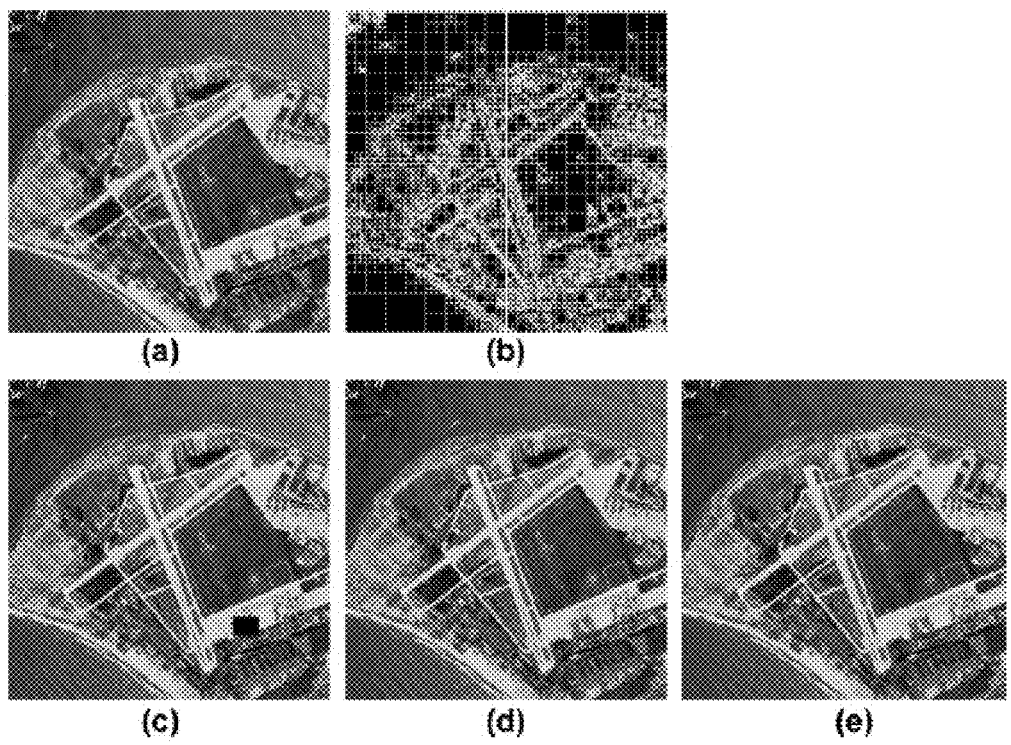

Referring to FIG. 18, diagram (a) is an original image and diagram (b) is an image generated by applying quad-tree decomposition on the original image. Diagram (c) is a tampered image and diagram (d) is a restored image using a typical method of Chiang. Diagram (e) is a restored image using a detection and recovery method in accordance with embodiments of the present invention.

Figure 19:
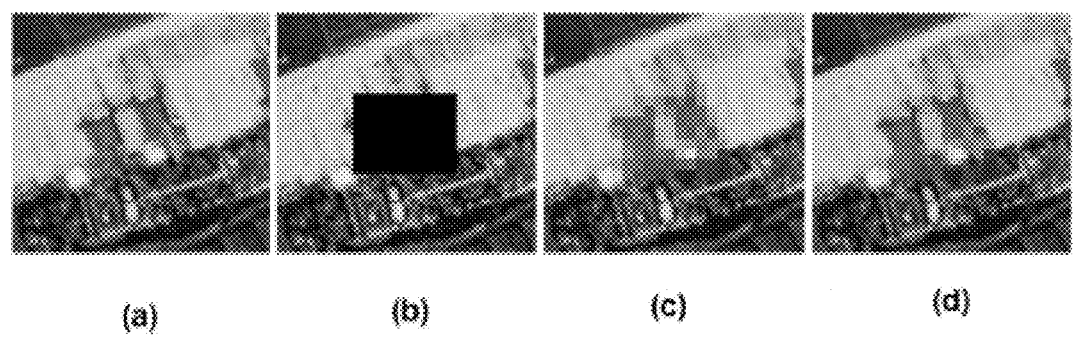

Referring to FIG. 19, diagram (a) is an area of interest in the original image of FIG. 17 and diagram (b) is a tampered area of FIG. 17. Diagram (c) is an area restored by a typical method of Chiang and a diagram (d) is an area restored by the detection and recovery method in accordance with embodiments of the present invention.

Figure 20:
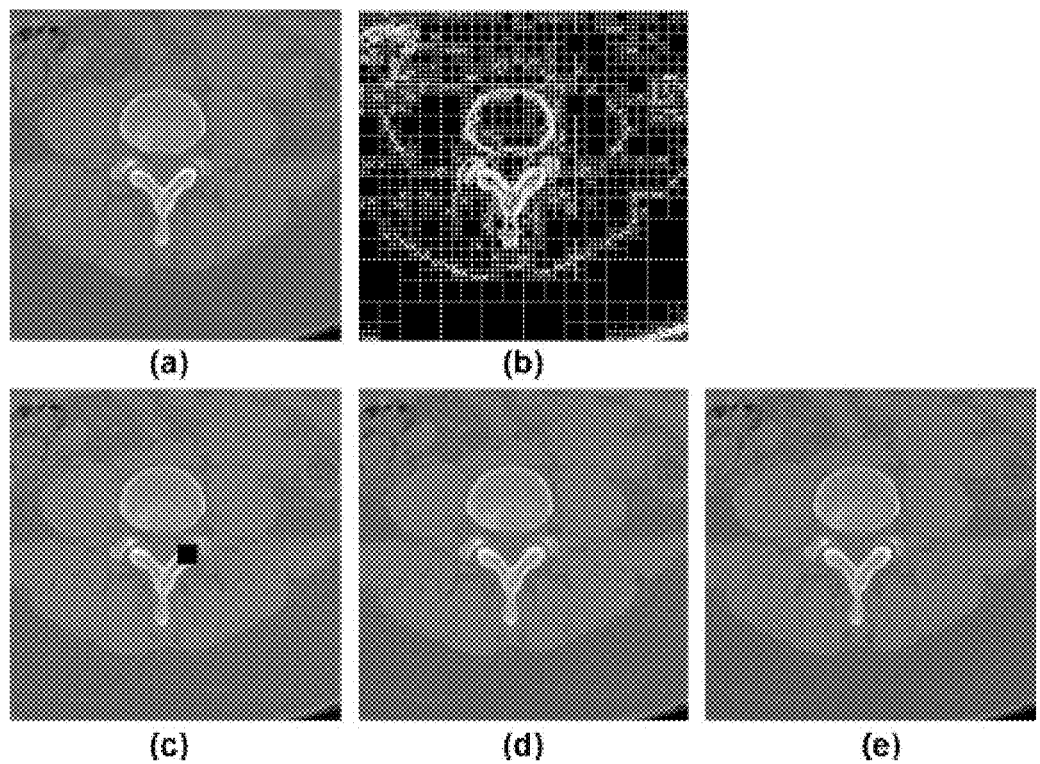

Referring to FIG. 20, diagram (a) is an original image and diagram (b) is an image generated by applying quad-tree decomposition on the original image. Diagram (c) is a tampered image and a diagram (d) is a restored image using a typical method of Chiang. Diagram (e) is a restored image using a detection and recovery method in accordance with embodiments of the present invention.

Figure 21:
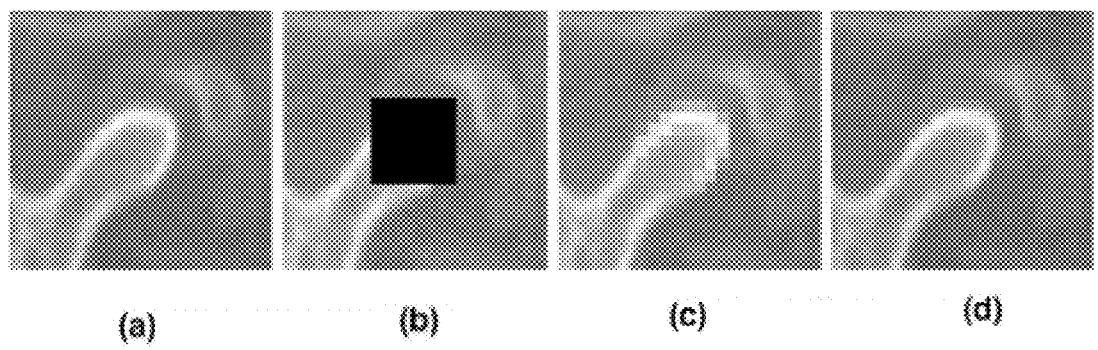

Referring to FIG. 21, diagram (a) is an area of interest in the original image of FIG. 20 and diagram (b) is a tampered area of FIG. 20. Diagram (c) is an area restored by a typical method of Chiang and diagram (d) is an area restored by a detection and recovery method in accordance with embodiments of the present invention.

Figure 22:
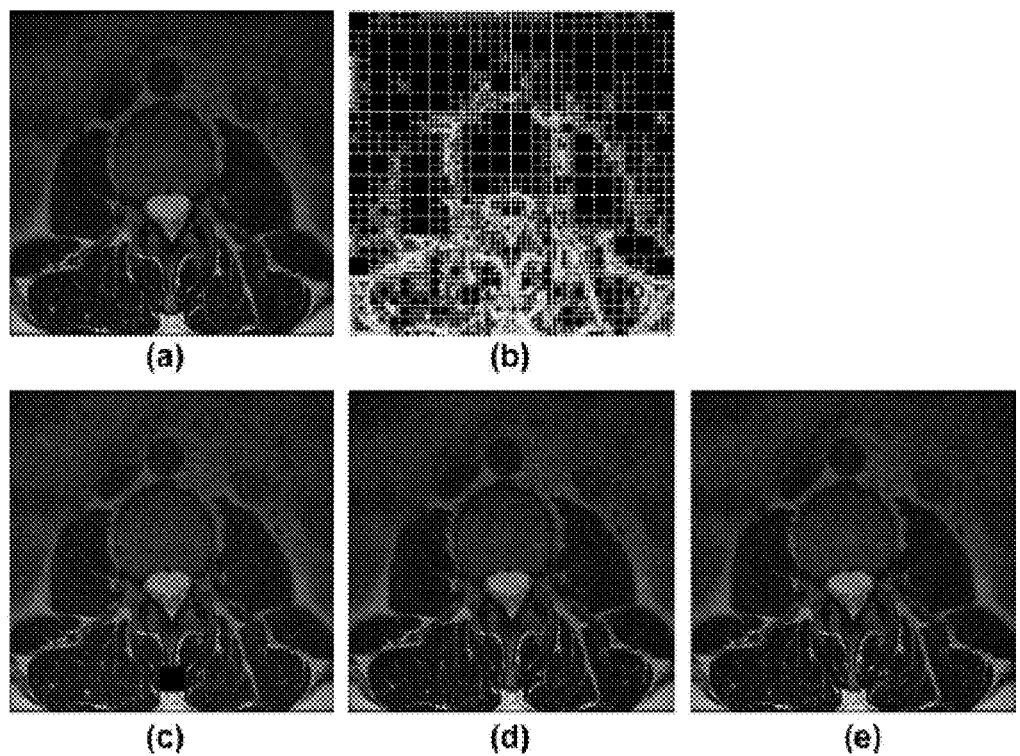

Referring to FIG. 22, diagram (a) is an original image and a diagram (b) is an image generated by applying quad-tree decomposition on the original image. Diagram (c) is a tampered image and diagram (d) is a restored image using a typical method of Chiang. Diagram (e) is a restored image using a detection and recovery method in accordance with embodiments of the present invention.

Figure 23:
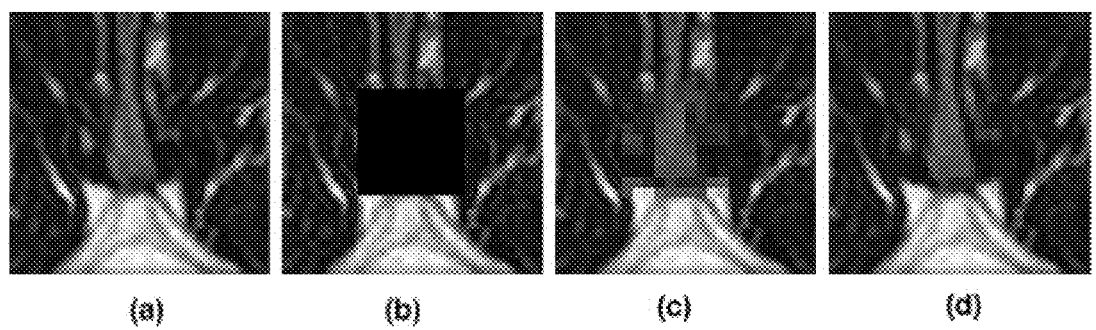

Referring to FIG. 23, diagram (a) is an area of interest in the original image of FIG. 22 and diagram (b) is a tampered area of FIG. 22. Diagram (c) is an area restored by a typical method of Chiang and diagram (d) is an area restored by a detection and recovery method in accordance with embodiments of the present invention.

The restoration performance of the typical Chiang method and the restoration performance of the method in accordance with embodiments of the present invention are measured using the images shown in diagrams in FIG. 16 and FIG. 23. As described above, the two quality metrics, PSWR and SSIN, are employed to measure the restoration performance.

Table 1 below shows the measurement results of the restoration performance.

TABLE 1

| | PSNR(dB) | | | SSIM | | |
|---|---|---|---|---|---|---|
| | Chiang method | Disclosed method | Improvement | Chiang method | Disclosed method | Improvement |
| FIGS. 16-17 | 43.67 | 52.2 | 8.53 | 0.6072 | 0.9567 | 0.3495 |
| FIGS. 18-19 | 42.48 | 45.32 | 2.84 | 0.8383 | 0.9244 | 0.0861 |
| FIGS. 20-21 | 53.7 | 65.76 | 12.06 | 0.8977 | 0.9938 | 0.0961 |
| FIGS. 22-23 | 70.583 | 82.22 | 11.637 | 0.999 | 0.999 | 0.0009 |

In addition to the four original images in FIG. 16 to FIG. 23, about 100 images each having a 8 bit/pixel and about 100 images each having 16 bit/pixel are used for comparison in order to prove generality of the method in accordance with embodiments of the present invention. Such comparison results are described in FIG. 24 to FIG. 31.

Figure 24:
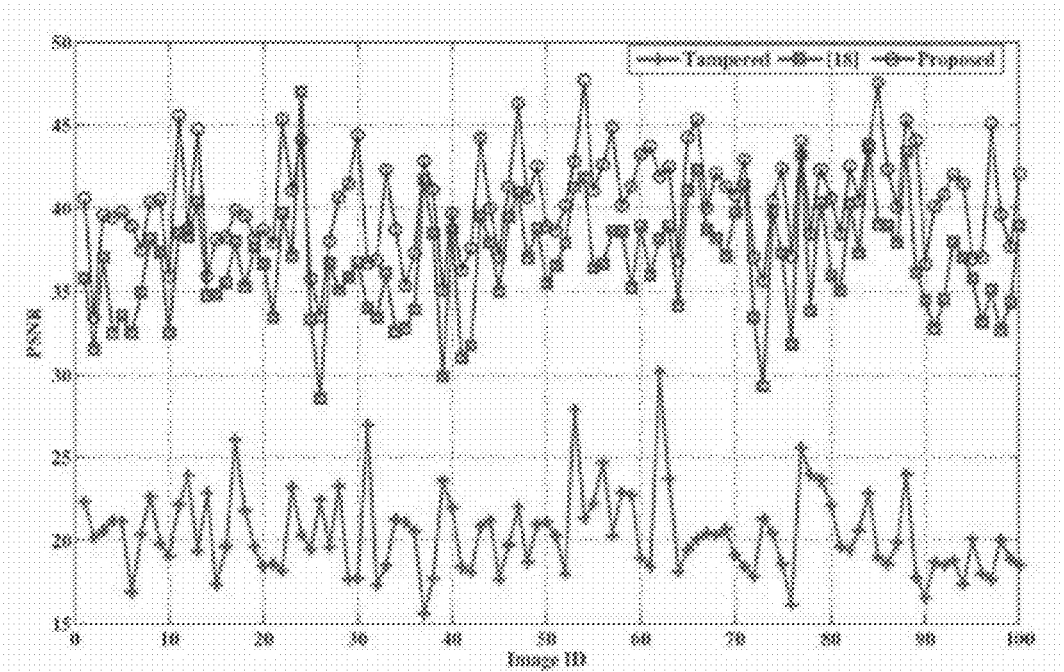
FIG. 24 is a graph showing PSNR values of images restored using a typical Chiang method and PSNR values of images restored using a detection and recovery method in accordance with embodiments of the present invention.
Figure 25:
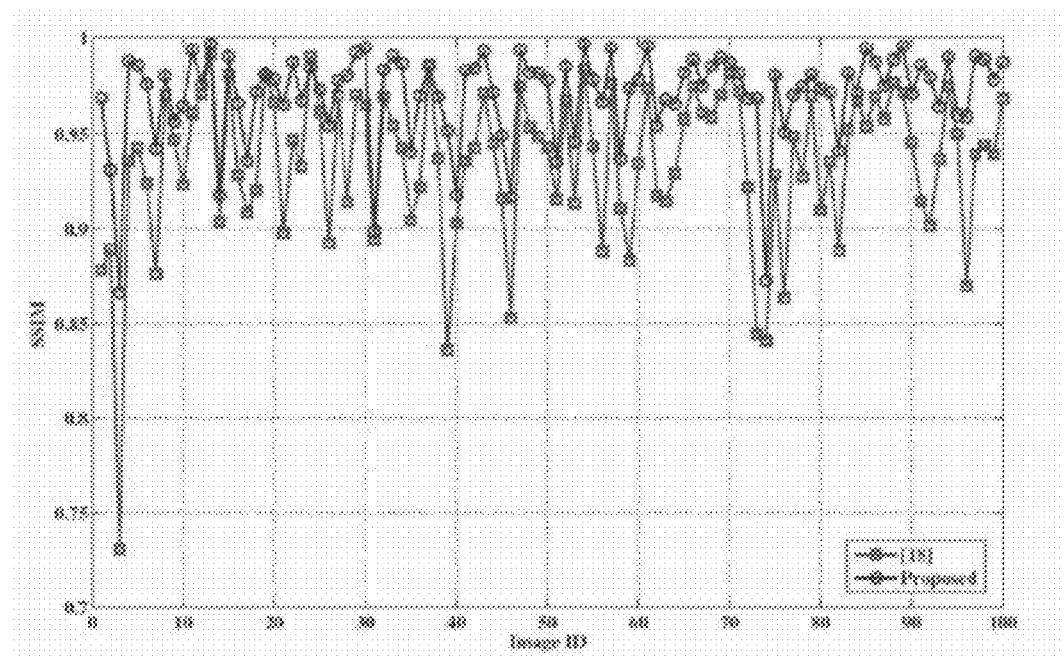
FIG. 25 is a graph showing SIMM values of images restored using a typical Chiang method and SIMM values of images restored using a detection and recovery method in accordance with embodiments of the present invention.

FIG. 24 is a graph showing PSNR values of images restored using a typical Chiang method and PSNR values of images restored using a detection and recovery method in accordance with embodiments of the present invention. FIG. 25 is a graph showing SIMM values of images restored using a typical Chiang method and SIMM values of images restored using a detection and recovery method in accordance with embodiments of the present invention.

Referring to FIG. 24 and FIG. 25, one hundred 512×512 8-bit grayscale images are used for quality measurement and each image has a tampered region sized of 100 pixels×100 pixels. The images each having the tampered region are restored using the typical Chiang method and the detection and recovery method in accordance with embodiments of the present invention. After restoration, a PSNR value and a SSIM value of each restored image are measured.

Figure 26:
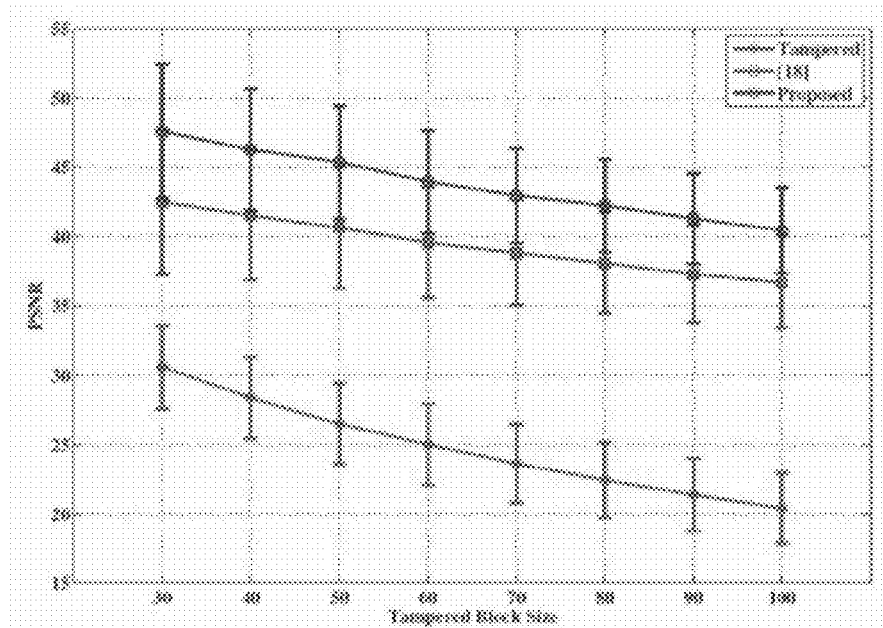
FIG. 26 is a graph showing average PSNR values of images restored using a typical Chiang method and average PSNR values of images restored using a detection and recovery method in accordance with embodiments of the present invention.
Figure 27:
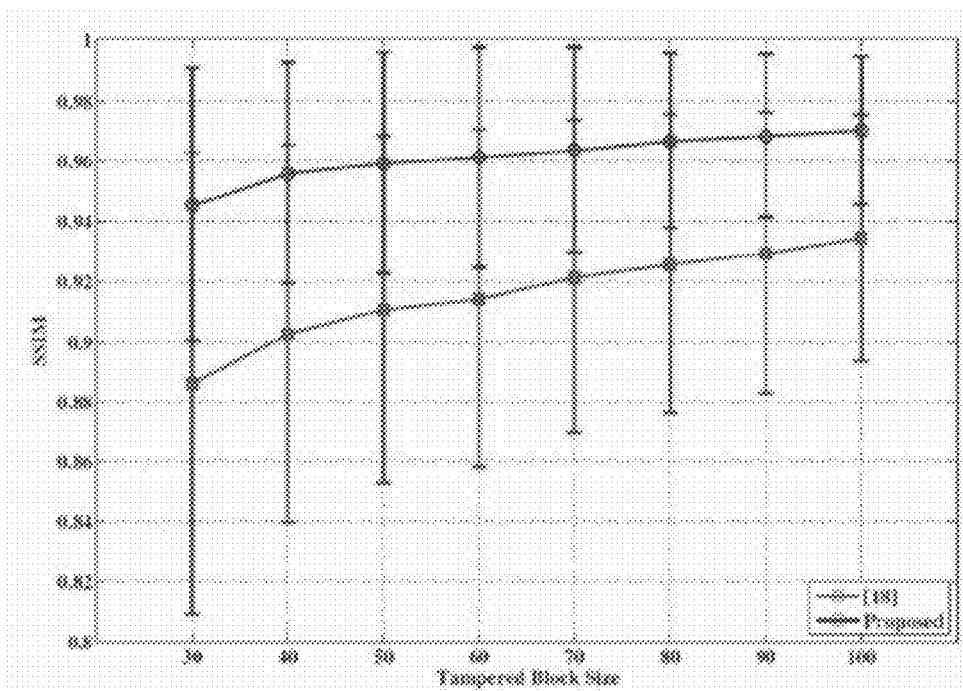
FIG. 27 is a graph showing average SIMM values of images restored using a typical Chiang method and average SIMM values of images restored using a detection and recovery method in accordance with embodiments of the present invention.

FIG. 26 is a graph showing average PSNR values of images restored using a typical Chiang method and average PSNR values of images restored using a detection and recovery method in accordance with embodiments of the present invention. FIG. 27 is a graph showing average SIMM values of images restored using a typical Chiang method and average SIMM values of images restored using a detection and recovery method in accordance with embodiments of the present invention.

Referring to FIG. 26 and FIG. 27, one hundred 512×512 8-bit grayscale images having various tampered region sizes are used for quality measurement. The tampered region size ranges from 30×30 to 100×100 (pixel by pixel). The images are restored using the typical Chiang method and the detection and recovery method in accordance with embodiments of the present invention. After restoration, an average PSNR value and an average SSIM value of restored images are measured.

As shown in FIG. 24 to FIG. 27, the detection and recovery method in accordance with embodiments of the present invention has performance about average 5 dB improved in PSNR and about average 0.05 improved in SSIM as compared to the detection and restoration method of Chiang.

Figure 28:
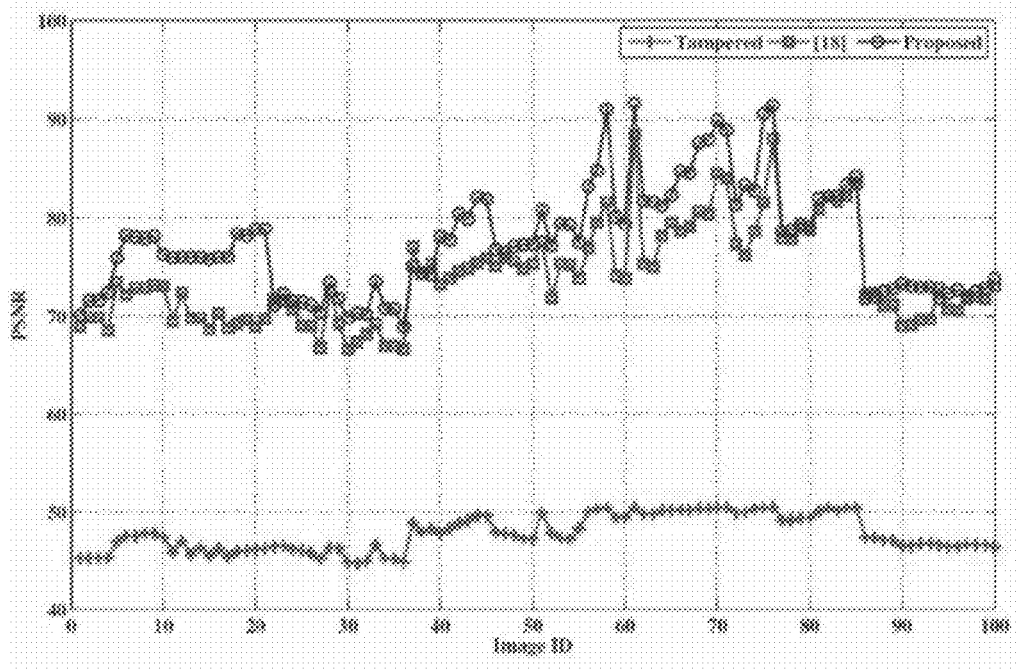
FIG. 28 is a graph showing PSNR values of images restored using a typical Chiang method and PSNR values of images restored using a detection and recovery method in accordance with embodiments of the present invention.
Figure 29:
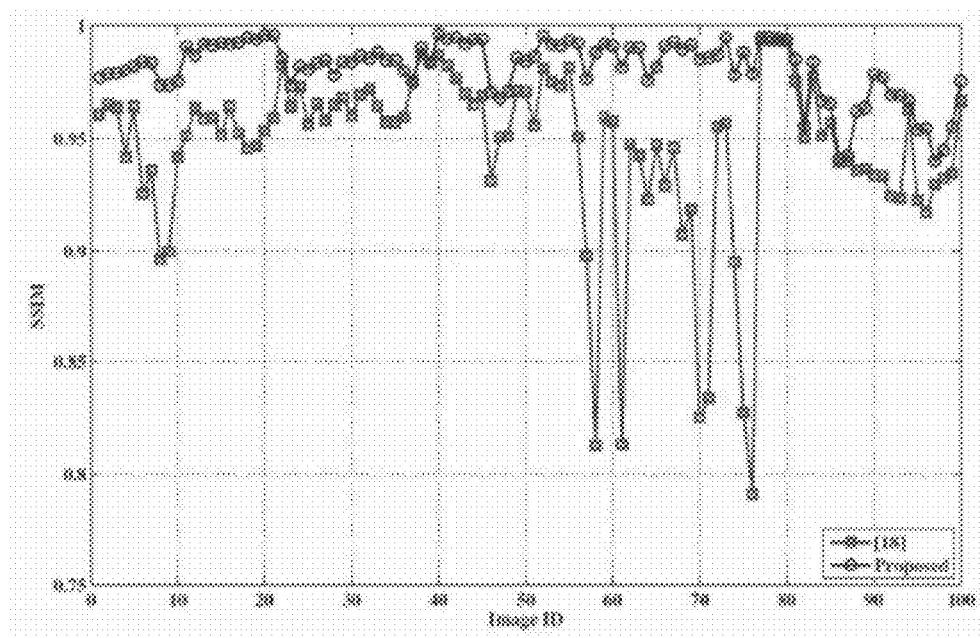
FIG. 29 is a graph showing SIMM values of images restored using a typical Chiang method and SIMM values of images restored using a detection and recovery method in accordance with embodiments of the present invention.

FIG. 28 is a graph showing PSNR values of images restored using a typical Chiang method and PSNR values of images restored using a detection and recovery method in accordance with embodiments of the present invention. FIG. 29 is a graph showing SIMM values of images restored using a typical Chiang method and SIMM values of images restored using a detection and recovery method in accordance with embodiments of the present invention.

Referring to FIG. 28 and FIG. 29, one hundred 512×512 16-bit medical images are used for quality measurement and each image has a tampered region sized of 100 pixels×100 pixels. The images each having the tampered region are restored using the typical Chiang method and the detection and recovery method in accordance with embodiments of the present invention. After restoration, a PSNR value and a SSIM value of each restored image arc measured.

Figure 30:
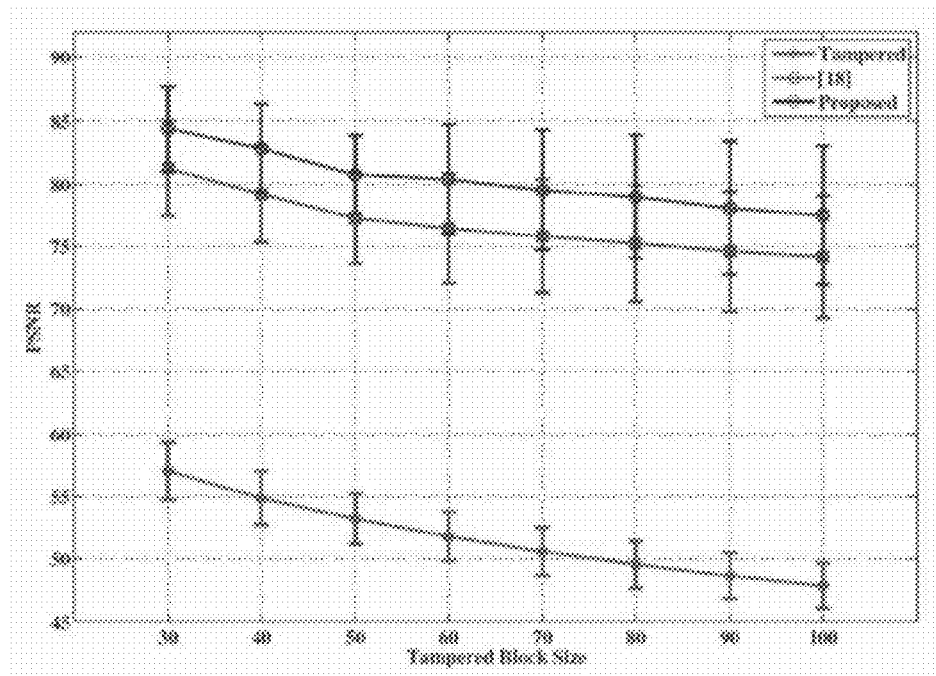
FIG. 30 is a graph showing average PSNR values of images restored using a typical Chiang method and average PSNR values of images restored using a detection and recovery method in accordance with embodiments of the present invention.
Figure 31:
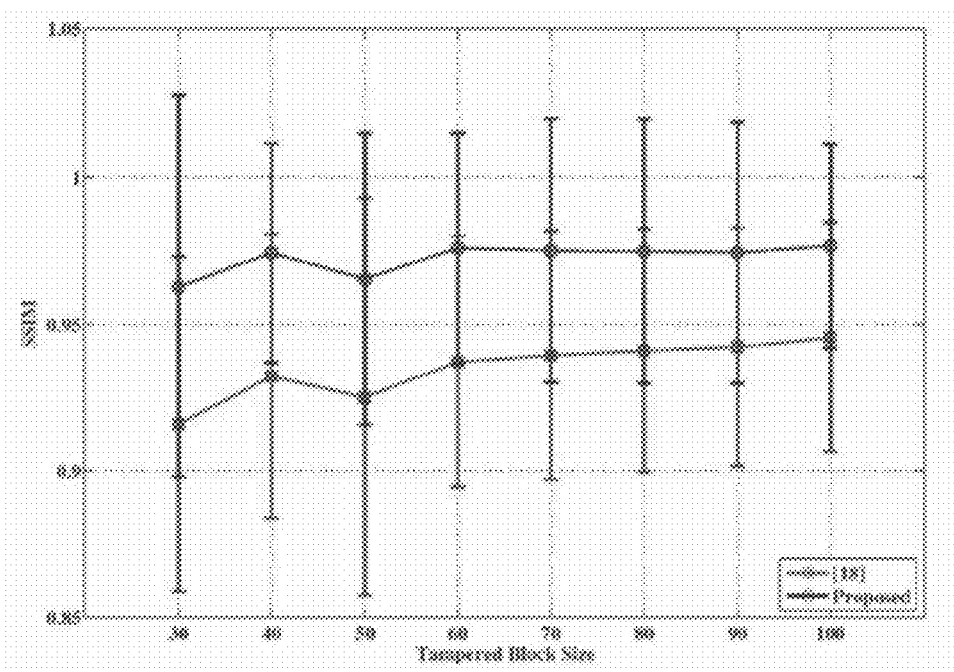
FIG. 31 is a graph showing average SIMM values of images restored using a typical Chiang method and average SIMM values of images restored using a detection and recovery method in accordance with embodiments of the present invention.

FIG. 30 is a graph showing average PSNR values of images restored using a typical Chiang method and average PSNR values of images restored using a detection and recovery method in accordance with embodiments of the present invention. FIG. 31 is a graph showing average SIMM values of images restored using a typical Chiang method and average SIMM values of images restored using a detection and recovery method in accordance with embodiments of the present invention.

Referring to FIG. 30 and FIG. 31, one hundred 512×512 16-bit medical images having various tampered region sizes are used for quality measurement. The tampered region size ranges from 30×30 to 100×100 (pixel by pixel). The images are restored using the typical Chiang method and the method in accordance with embodiments of the present invention. After restoration, an average PSNR value and an average SSIM value of restored images are measured.

As shown in FIG. 28 to FIG. 31, the detection and recovery method in accordance with embodiments of the present invention has performance about average 4 dB improved in PSNR and about average 0.05 improved in SSIM as compared to the detection and restoration method of Chiang.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for processing a digital image, the apparatus comprising:
    an input unit configured to receive the digital image;
    an extraction unit configured to extract a recovery feature from the received digital image using quad-tree decomposition, wherein the recovery feature is binary data that represents unique characteristics of the received digital image;
    an embedding unit configured to embed the extracted recovery feature into the received digital image; and
    an output unit configured to output the digital image embedded with the recovery feature as a feature hidden image.

2. The apparatus of claim 1, wherein the extraction unit is configured to extract the recovery feature from the original digital image with quad-tree decomposition.

3. The apparatus of claim 2, wherein the extraction unit is configured to:
    decompose the received digital image into a plurality of variable-sized image blocks;
    calculate an average pixel value of each one of the plurality of variable-sized image blocks; and
    calculate a binary value of the calculated average pixel value of each block and combine binary values of the plurality of variable-sized blocks into a recovery feature of the received digital image.

4. The apparatus of claim 1, wherein the embedding unit comprises:
    a sub-sampling unit configured to receive the digital image and to generate a plurality of sub-sampled images by decomposing the received digital image according to a predetermined sampling position;
    a difference image generator configured to receive the sub-sampled images and to generate a plurality of difference images based on difference between one reference sub-sampled image and the others included in the sub-sampled images, where the reference sub-sampled image is one selected from the sub-sampled images;
    an embedding level generator configured to calculate at least one embedding level from histograms of the plurality of difference images according to a length of the recovery feature; and
    a difference image modificator configured to obtain empty bins by modifying the plurality of difference images using the at least one embedding level and to embed the recovery feature into the empty bins.

5. The apparatus of claim 4, wherein:
    the embedding level generator is configured to generate a left embedding level and a right embedding level according to a length of the recovery feature; and
    information on the left embedding level and the right embedding level is provided with the feature hidden image.

6. The apparatus of claim 5, wherein the difference image modificator is configured to:
    generate first modified difference images having empty bins by modifying the difference images using the left embedding level and the right embedding level;
    generate second modified difference images by embedding the recovery feature in the empty bins of the first modified difference images using the left embedding level and the right embedding level; and
    transfer the second modified difference images to the output unit.

7. A method for, by a processor of a digital image processing apparatus, processing a digital image input from an input circuit of the digital image processing apparatus, the method comprising:
    extracting, by the processor, a recovery feature from the digital image;
    generating, by the processor, a plurality of sub-sampled images by performing sub-sampling on the digital image;
    generating, by the processor, difference images based on differences between one sub-sampled image and the others;
    calculating, by the processor, embedding levels from histogram of the generated difference images according to a length of the recovery feature;
    obtaining, by the processor, empty bins for embedding the recovery feature in the digital image;
    embedding, by the processor, the recovery feature into the obtained empty bins; and
    providing, by the processor, the digital image embedded with the recovery feature as a feature hidden image.

8. The method of claim 7, wherein the extracting by the processor includes:
    decomposing the digital image into a plurality of variable-sized blocks using quad-tree decomposition;
    calculating an average pixel value of each block of the plurality of variable-sized blocks; and
    calculating a binary value of the calculated average pixel value and combining the calculated binary values of the plurality of variable-sized blocks, as the recovery feature of the digital image.

9. The method of claim 8, wherein the decomposing by the processor includes:
dividing the digital image into four equal-sized blocks;
determining whether values of all pixels in each equal-sized block are within a predetermined dynamic range and, if not;
dividing the corresponding block into four sub-blocks.

10. The method of claim 7, wherein the obtaining empty bins by the processor includes shifting a histogram of the difference images in left and right directions using the left and right embedding levels.

\* \* \* \* \*